(12) United States Patent
Sprigg et al.

(10) Patent No.: US 8,332,270 B2
(45) Date of Patent: Dec. 11, 2012

(54) SYSTEM AND METHOD FOR UTILIZING A WIRELESS COMMUNICATIONS DEVICE

(75) Inventors: Stephen A. Sprigg, Poway, CA (US); Richard W. Gardner, Rancho Santa Fe, CA (US); Mahesh Moorthy, Andhra Pradesh (IN); Scott Papineau, San Diego, CA (US); Samuel Jacob Horodezky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 12/697,523

(22) Filed: Feb. 1, 2010

(65) Prior Publication Data

US 2010/0211441 A1    Aug. 19, 2010

Related U.S. Application Data

(60) Provisional application No. 61/153,674, filed on Feb. 19, 2009.

(51) Int. Cl.
 *G06Q 30/00* (2012.01)
(52) U.S. Cl. .................................................. 705/14.71
(58) Field of Classification Search ................ 705/14.71
 See application file for complete search history.

(56) References Cited

U.S. PATENT DOCUMENTS

| | | | |
|---|---|---|---|
| 5,208,446 A | 5/1993 | Martinez | |
| 5,221,838 A | 6/1993 | Gutman et al. | |
| 5,387,784 A | 2/1995 | Sarradin | |
| 6,076,070 A | 6/2000 | Stack | |
| 2004/0138986 A1 | 7/2004 | Petrovich | |
| 2004/0205394 A1 | 10/2004 | Plutowski | |
| 2006/0080221 A1* | 4/2006 | Murakami | 705/37 |
| 2007/0208630 A1 | 9/2007 | Chatter et al. | |
| 2007/0215687 A1 | 9/2007 | Waltman | |

OTHER PUBLICATIONS

"Are the temptations of online reverse auctions appropriate for your business?" by: Sameer Kumar and Megan Maher; Supply Chain Management; v 13n4; pp: 304-316; 2008.*
International Search Report and Written Opinion—PCT/US2010/024667, International Search Authority—European Patent Office—Oct. 1, 2010.

* cited by examiner

*Primary Examiner* — John Weiss
*Assistant Examiner* — Michael Stibley
(74) *Attorney, Agent, or Firm* — Nicholas A. Cole

(57) ABSTRACT

A system and method for determining the identity of a product and then calculating an offer price for the product are disclosed. The identity of the product may be determined using near-field communication in one aspect. The system and method are operable to enable retailers to provide a lowest price for the product and conduct a series of offer calculations to determine an offer for a consumer. The offer is based, in part, on costs to the consumer in executing the transaction (e.g., travel time, fuel, etc.). The offer may be higher than the lowest price as determined by each retailer, respectively, while still providing a discount to the consumer to entice a purchase of the product.

32 Claims, 14 Drawing Sheets

SYSTEM AND METHOD FOR UTILIZING A WIRELESS COMMUNICATIONS DEVICE

This application claims priority to and incorporates by reference U.S. Provisional Application No. 61/153,674 entitled "SYSTEM AND METHOD FOR UTILIZING A WIRELESS COMMUNICATIONS DEVICE," filed on Feb. 19, 2009.

DESCRIPTION OF THE RELATED ART

Wireless devices are a part of many consumers' lives. The capabilities of wireless devices have expanded over the past decade to include GPS navigation, voice recognition, 3-D graphics, touchscreen functionality, emailing, calendaring, streaming multimedia, digital photography, etc. However, opportunities exist to expand the functionality of wireless devices to assist consumers in efficiently purchasing goods and services.

BRIEF DESCRIPTION OF THE DRAWINGS

In the figures, like reference numerals refer to like parts throughout the various views unless otherwise indicated.

DETAILED DESCRIPTION

Figure 1:
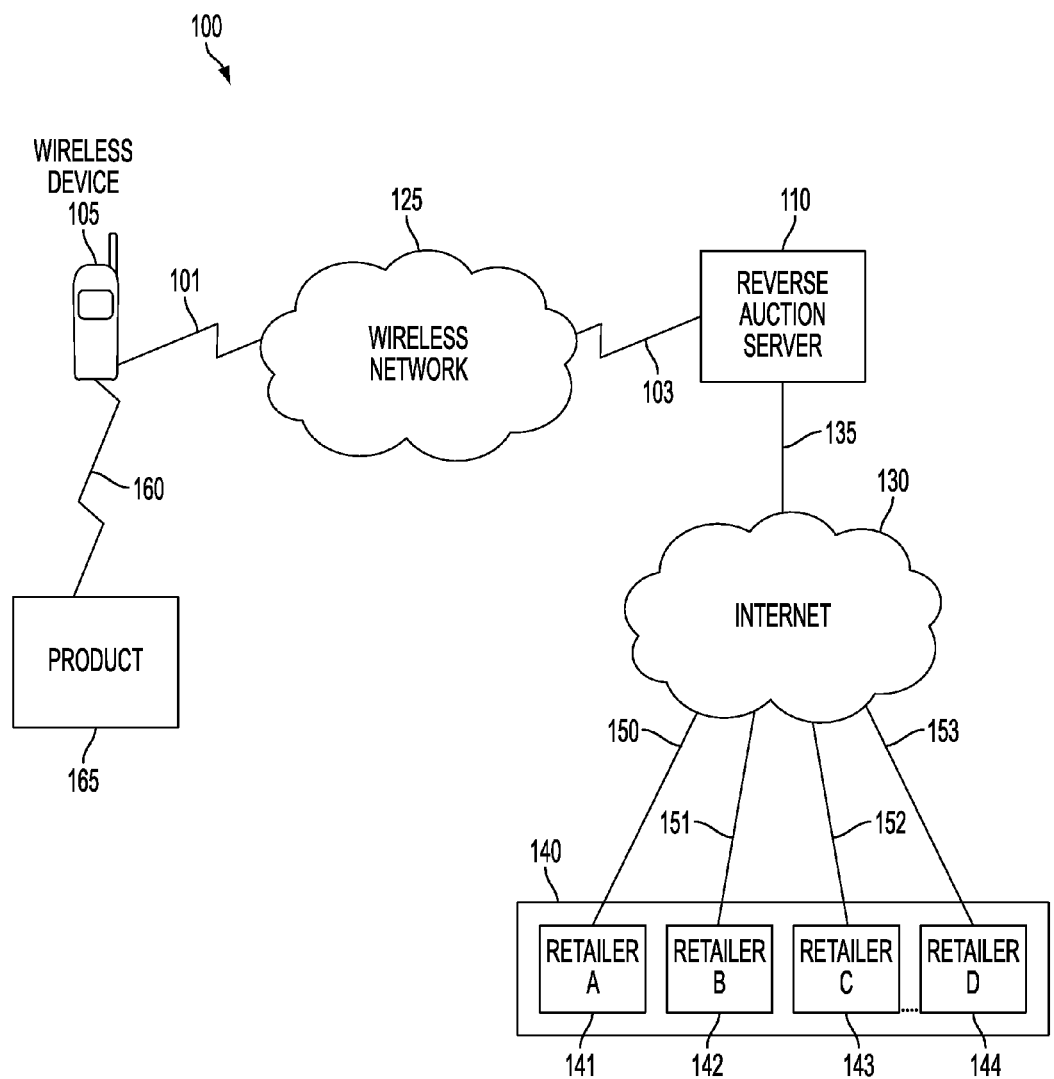
FIG. 1 is a block diagram of a system operable to conduct a reverse auction system.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component" or "module" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communications device," and "wireless handset" are used interchangeably. A wireless device could be a cellular telephone, a pager, a personal digital assistant ("PDA"), a smartphone, a navigation device, or a computer with a wireless connection.

"Goods" as used in this application refers to tangible and intangible goods available for purchase by consumers. While this application may refer to "goods" for convenience, it is not limited to tangible and intangible goods but rather could include services as well.

As used in this application, the terms "user" and "consumer" are used interchangeably and one of skill in the art will appreciate that either refers to a human utilizing the disclosed system, method, or apparatus.

To place the invention in the correct perspective, it is necessary to discuss, at a high level, the socioeconomic motivations of consumers and retailers. In North America and Western Europe, consumer transactions for relatively inexpensive goods are generally not dynamic i.e. goods are offered by a retailer at a predefined price and the consumer must either accept the retailer's offer or shop elsewhere. In short, retailers offer goods in a "take it or leave it" fashion. For example, consumer electronics stores such as Best Buy®, Amazon.com®, Wal-Mart®, Target®, etc. offer goods on a "take it or leave it" basis. Consumers rely on advertisements, in-store visits, word of mouth, etc. to ascertain the price and decide whether or not to purchase the offered goods.

By comparison, some retail industries operate on a system of bartering. For example, retail car sales are largely conducted by an iterative process of offer and counteroffer. For example, a car may be offered with a Manufacturer's Suggested Retail Price ("MSRP"), which is an artificially high price which does not take into account local conditions, wholesale cost, discounts, etc. Car dealers then barter with consumers to reach a price that is often somewhere between the wholesale price (which is generally unknown to the public) and the MSRP (which is artificial). Thus, some industries rely on bartering with consumers to reach a mutually acceptable price, while other industries simply offer goods at a particular price without compromise.

One explanation for the difference in approaches to pricing is due to transaction costs. "Transaction costs" are the costs associated with making an economic exchange. The transaction costs for retailers who offer goods in a "take it or leave it" fashion are relatively low compared to the transaction costs of "bartering" retailers because the "bartering" retailers must engage in protracted offer/counteroffer negotiations to secure each sale. For example, a Lexus® car dealer must meet with prospective clients, make phone calls, print business cards, supervise test drives, etc. In contrast, the "take it or leave it" retailer simply places the goods in front of the public and waits for consumers to purchase the goods with a store clerk. For example, BestBuy® affixes a price label on a digital camera, places the camera on a store shelf, and accepts payment at one of many cash registers.

One considerable transaction cost is the cost of the employee's compensation. For example, a retail store clerk in the United States earns, on average, $24,000 per year in salary (source: indeed.com, visited Dec. 22, 2008). Retail store clerks generally do not have the authority to barter over the price of goods offered in their store and are employed to simply register transactions and receive payment from consumers. In sharp contrast, a car dealer earns, on average, $66,000 per year, due in large part to the requirement that car dealers barter with consumers over the price of automobiles (source: indeed.com, visited Dec. 22, 2008). One conclusion that may be drawn is bartering dramatically increases an employee's required compensation and thus drives up transaction costs.

High transaction costs may be acceptable in some industries (such as retail car sales) because of the low volume and high price of the goods i.e. cars are one of the most expensive purchase for consumers. In comparison, high transaction costs for high volume, low price goods (such as consumer electronics, e.g. iPods, digital cameras, Nintendo® Wiis, etc.) might create costs the market would not be willing to bear.

In spite of increased transaction costs, the bartering process between the retailer and the consumer can be beneficial. The parties may reach a price that is optimal for both parties, thus yielding a "win-win" situation. There exists a long-felt need for a system that allows consumers to efficiently barter over goods which are relatively low in price and sold in relatively high volume while not increasing transaction costs to the point where the transaction costs make the bartering process economically inefficient. This application proposes a system, a method, and an apparatus for allowing retailers and consumers to barter over the price of goods in a manner that has low transaction costs and results in a "win-win" situation for both retailers and consumers.

FIG. 1 illustrates a system 100 for reverse auction purchasing. A wireless device 105 is connected over a link 101 to a wireless network 125. The wireless network 125 may be operated by a wireless network operator or a third party; therefore, the link 101 and a link 103 may be provided by a wireless network operator or a third party in order to access a reverse auction server 110. The wireless network operator owns the infrastructure and any licenses to operate the wireless communication technology. Examples of wireless network operators in the United States are Verizon®, Sprint®, and AT&T®. However, some wireless technologies are operated by the third party, which owns infrastructure and may not require a license to operate certain wireless technologies (e.g., 802.11a/b/g/n or "Wifi"). For instance, the links 101 and 103 could be facilitated by a "Wifi" hotspot at a local coffee shop (e.g., Starbucks®) or by the retailer itself (e.g., BestBuy® could provide "Wifi" access within its stores). The reverse auction purchasing system 100 could operate across the links 101 or 103 whether hosted by the wireless network operator or the third party.

The reverse auction server 110 is generally tasked with coordinating among retailers and consumers to offer goods at a discounted price. The reverse auction server 110 may be connected to the Internet 130 over a link 135. The link 135 could be wireless, as described above with respect to the links 101, 103. Alternatively, the link 135 could be a wired connection similar to those found in a local area network configuration (e.g., gigabit Ethernet).

The Internet 130 provides connectivity to a plurality of retailers 140. The plurality of retailers 140 is comprised of retailer A 141, retailer B 142, retailer C 143, and retailer D 144. One of skill in the art will appreciate that the plurality of retailers 140 is shown in FIG. 1 with only four retailers (A, B, C, and D). However, the number of retailers within the plurality 140 could be any number greater than two. Each of the retailers within the plurality 140 may be connected to the Internet over the links 150, 151, 152, 153, respectively. Similar to the link 135, the links 150, 151, 152, 153 could be wireless as described with respect to the links 101, 103. Alternatively, the links 150, 151, 152, 153 could be a wired connection, typically found in a local area network configuration (e.g., gigabit Ethernet).

The wireless device 105 may be operable to receive information over a link 160 about a product 165. In one aspect, the information communicated about the product 165 is achieved using near-field communication. For example, a transmitter associated with the product 165 may provide information operable to identify the name, price, inventory, etc. of the product 165 and convey such information to the wireless device 105 over the link 160. In another aspect, the wireless device could utilize a camera on the wireless device 105 in order to take a photo of the product 165 and perform image recognition, computer vision, pattern recognition, etc. in order to determine the identity of the product 165. Examples of retailers 140 comprise Amazon.com, Wal-Mart, Target, Best Buy, Fry's Electronics, Staples, Costco, Sears, Lowe's, The Home Depot, Safeway, Ralph's, Macy's, JC Penney's, Gap, Toys R Us, Nordstrom, GameStop, Bed Bath & Beyond, Borders, Barnes & Noble, Foot Locker, RadioShack, Starbuck's, McDonald's, Petco, Circuit City, K-Mart, Buy.com, Overstock.com, Wal-Mart.com, Target.com, BestBuy.com, etc. Note that many of these retailers have online counterparts. For example, Wal-Mart owns and operates Wal-Mart.com, its online retail store. Thus, the retailers 140 could be comprised of both physical and online retailers. In one configuration, retailer A 141 could be Wal-Mart®, retailer B 142 could be Amazon.com®, retailer C 143 could be Target®, and retailer D 144 could be BestBuy®. In an alternative configuration, retailer D 144 could be WalMart.com. Thus, the physical store could even compete with its own online counterpart in certain situations.

In one aspect, the link 101 could be implemented using code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.11a/b/g/n ("Wifi"), World Interoperability for Microwave Access ("WiMAX"), Bluetooth, or other wireless communication technology.

Figure 2:
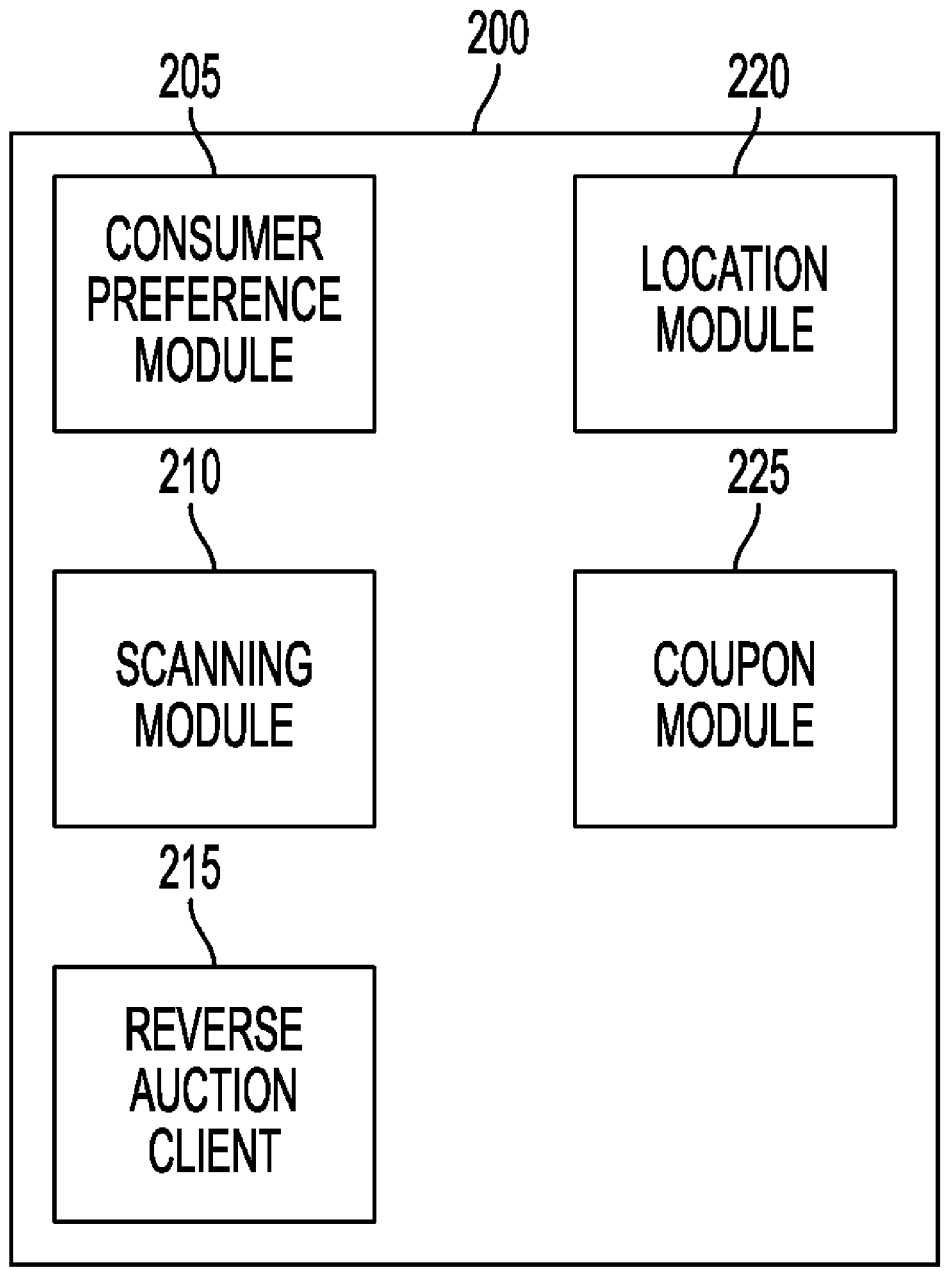
FIG. 2 is a block diagram of a wireless device operable to utilize the reverse auction system.

FIG. 2 is a block diagram of a wireless device 200. In one embodiment, the wireless device 200 may be utilized similarly to the wireless device 105. The wireless device 200 may contain a number of modules which may be implemented in hardware responsive to instructions contained in firmware or memory (not shown). The modules within the wireless device 200 may comprise a consumer preference module 205, a scanning module 210, a reverse auction client 215, a location module 220, and a coupon module 225.

The consumer preference module 205, as the name suggests, manages consumer-entered preferences. The reverse auction server 110 may conduct a reverse auction and may require preferences from the consumer to be entered into the wireless device 105. Such preferences may greatly change the outcome of the reverse auction process.

The consumer preferences may comprise any number of factors which may influence a price a consumer is willing to pay. In one aspect, a consumer preference could be the consumer's cost of travel to a store to purchase an item. For example, the consumer could enter the cost of gasoline, the wear-and-tear costs on the consumer's vehicle, road tolls, vehicle registration, vehicle insurance, public transportation costs, etc. In yet another aspect, the consumer preference could be the value of the consumer's time to purchase the item. For example, the consumer could be a orthopedic surgeon whose time is very valuable. In such a case, the consumer may state that the value of her leisure time is $100 per hour, since the surgeon has very little leisure time. In contrast, a hungry college student with ample free time may value his time at $5 per hour, since the student has ample leisure time. The reverse auction system 100 may take into consideration the value of the consumer's leisure time in order to conduct a reverse auction.

A scanning module 210 may determine the identity of goods, products, and/or services. The scanning module 210 may utilize specialized hardware to receive information about goods. In one aspect, the scanning module 210 may utilize a camera in order to ascertain the identity of the desired product. For example, the scanning module 210 could take a picture of a bottle of wine and perform image recognition on the label, barcode, and/or packaging to determine the identity and source of the wine. In another aspect, the scanning module 210 could utilize a barcode scanner. In yet another aspect, the scanning module 210 may utilize near-field communication to determine the identity of the goods. In still another aspect, the scanning module 210 could receive data based on human input. For example, the user could use a keypad or touchscreen to input data about the product 165 (e.g., UPC, description, brand, etc.) Once the identity of the product is determined, the identity may be communicated to a reverse auction client 215.

The reverse auction client 215 communicates information between the wireless device 105 and the reverse auction server 110 to allow the consumer of the wireless device 105 and the retailer to conduct a reverse auction. The reverse auction client 215 may communicate to the reverse auction server 110 consumer preferences as gathered and processed by the consumer preference module 205. In addition, the reverse auction client 215 may communicate the identity of desired goods, products, and/or services as gathered and processed by the scanning module 210. Further, the location as ascertained by a location module 220 may be communicated to the reverse auction server 110 via the reverse auction client 215. Finally, a coupon module 225 may receive coupons via the reverse auction client 215. In one aspect, the reverse auction client 215 may present a user interface to the wireless device 105 via its display and allow user-input via a keypad. In another aspect, the reverse auction client 215 may present and receive information via a touchscreen. For example, the reverse auction client 215 could be a BREW® application running on the new LG Dare® touchscreen phone.

The location module 220 may determine the location of the wireless device 200 such that the reverse auction server 110 may determine the impact of consumer preferences gathered by the consumer preference module 205. For example, if the location module 220 determines that the location of the wireless device is in Los Angeles where retailer A 141 is located. Then, the reverse auction server 110 could calculate the distance to retailer B 142, retailer C 143, and retailer D 144. The distance to the various retailers is useful in determining the travel costs as gathered by the user preference module 205.

The coupon module 225 may receive coupons via the reverse auction client 215 from the reverse auction server 110. The reverse auction purchase process 400, infra, further illustrates the usage of the coupon module 225 in the reverse auction system 100.

Figure 3A:
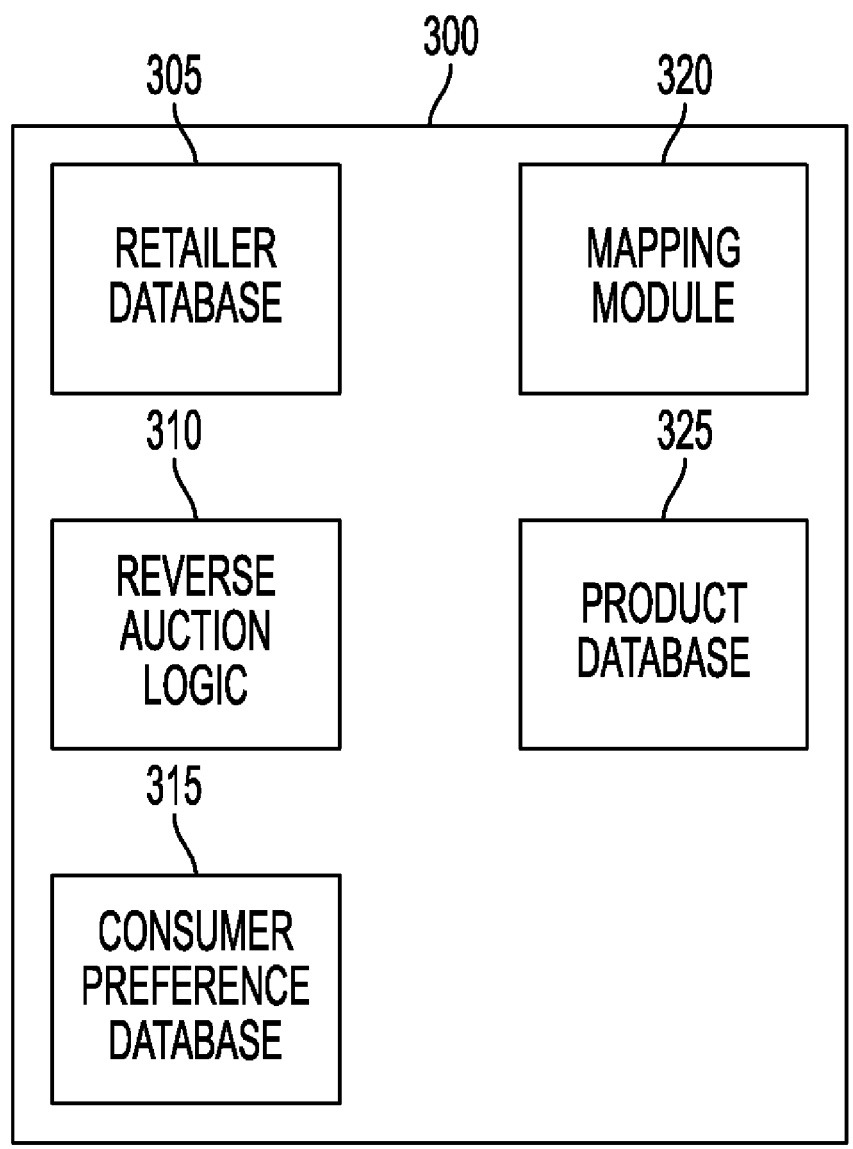
FIG. 3A is a block diagram of a reverse auction server.
Figure 3B:
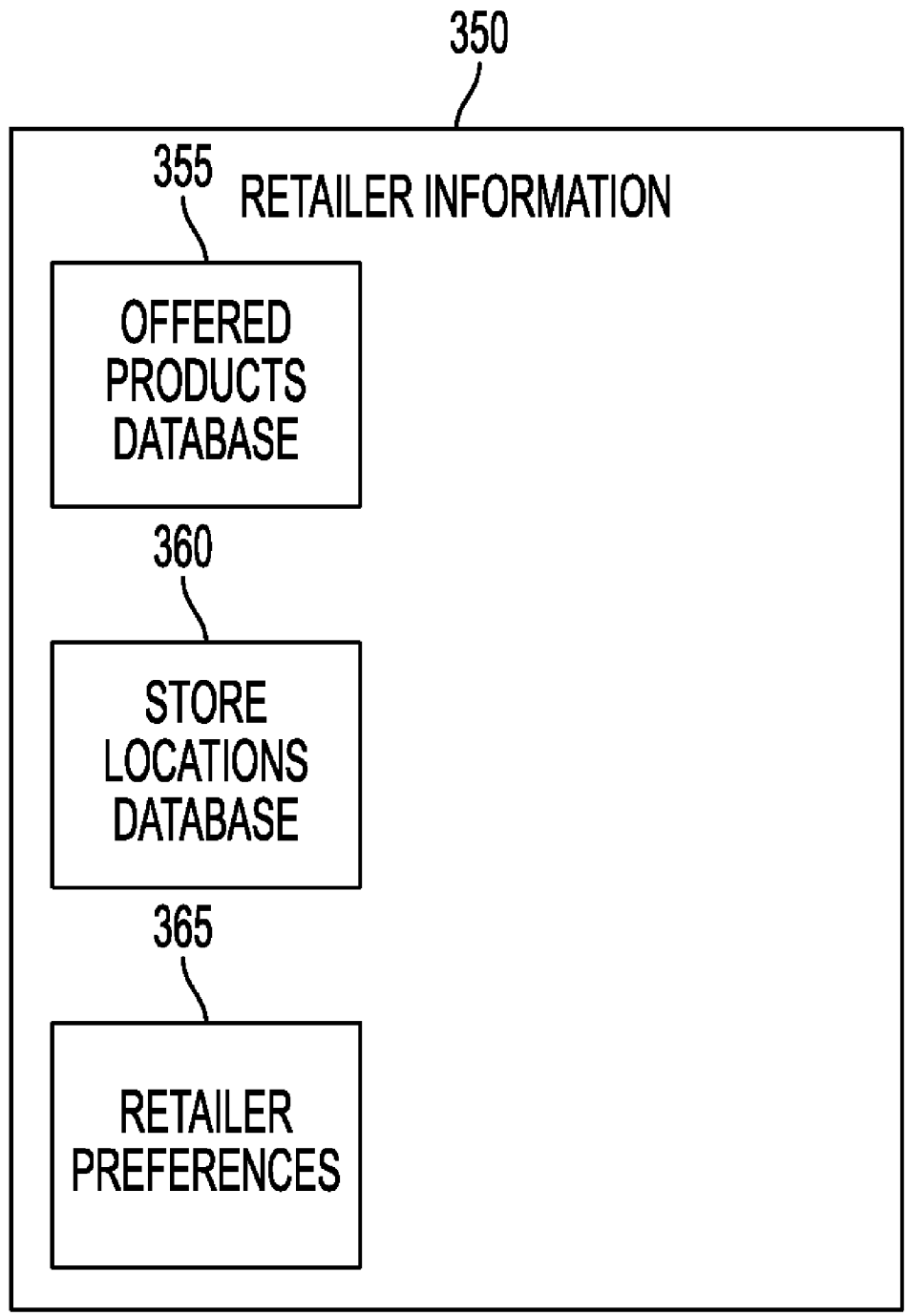
FIG. 3B is a block diagram of a retailer information data structure.

FIG. 3A depicts the various modules within a reverse auction server 300. In one aspect, the reverse auction server 300 may be similar to the reverse auction server 110 described supra. As previously stated with regard to FIG. 2, any of the modules in FIG. 3A could be implemented in either hardware or software. The reverse auction server 300 may be comprised of the following modules: a retailer database 305, a reverse auction logic 310, a consumer preference database 315, a mapping module 320 and a product database 325. Note that one of skill in the art may configure the reverse auction server 300 differently without departing from the spirit and scope of this disclosure. For example, the mapping module 320 could be hosted or operated by a third-party partner which specializes in mapping and navigation data (e.g., MapQuest®, Google®, Garmin®, etc.). In addition, the modules shown in FIG. 3A could be situated across different physical machines, either on the client or server-side. Again, one skilled in the art will appreciate the disclosure as shown and realize that many configurations of the modules are functionally equivalent. Some of the modules in FIG. 3A manipulate, process, and/or store various data structures which may be implemented in hardware and/or software; exemplary data structures are presented in FIG. 3B, FIG. 3C, and FIG. 3D, infra.

The retailer database 305 is generally utilized to gather and store information, which is specific to the retailers 140. The reverse auction server 300 may gather static retailer information 350 from the retailers 140, as shown in FIG. 3A. The retailer information 350 may contain: a plurality of offered products 355, store locations 360, and retailer preferences 365. One of skill in the art may associate additional information with the retailer information 350. For example, store reviews, photos, consumer product reviews, return/exchange policies, shipping costs, promotions, advertisements, etc.

One of skill in the art may store the retailer information 350 in a relational database (e.g., MySQL, SQLite, Postgresql, etc.), and, as such, the information may be referenced by the retailer information 350 without actually being stored in the retailer information 350 itself.

The offered products database 355 enumerates the products being offered by the retailer. In one aspect, the products are universally tracked by the same product ID among various retailers. For example, books utilize the International Standard Book Number ("ISBN") in order to catalog, identify, and sell books. Alternatively, Universal Product Codes ("UPCs") could be utilized for products. Thus, each of the retailers 140 could utilize a common identification means in order to conduct the reverse auction purchase process 400. In another aspect, the reverse auction server 300 could perform a translation of product IDs which are retailer-specific to ones which are universal across retailers. For example, retailer A 141 could employ a proprietary identification means for its products and the reverse auction server 300 could translate the proprietary identification means into a universal product ID (e.g., ISBN, UPC, etc.). Thus, the reverse auction server 110, in one aspect, could perform additional processing to allow retailers with unique inventorying systems to still participate in the reverse auction purchase process 400 without altering their current mode of operation. Alternatively, retailers 140 could agree upon a universal product identification system and reduce the operational overhead for the reverse auction server 300.

The store locations database 360 enumerates the locations of the retailers' 140 stores. In one aspect, online stores could be flagged as online in the store location database 360. The reverse auction server 300 could utilize this online flagging in order to alter the reverse auction process 500 such that conditions, specific to online shopping, are taken into consideration (e.g., free shipping, no tax, shipping delay, etc.).

The offered product database 355 and the store locations database 360 could be cross-referenced such that the products offered and the store locations could be correlated in order to match products to actual in-stock availability of the product 165. For example, the product 165 may be offered by the retailer A 141 but only available from its online website or at specific store locations. One of skill in the art will appreciate that tracking products against store locations may be implemented in a number of ways. In short, the reverse auction server 300 is more effective at providing discounted prices to consumers when the products 165 being discounted are actually available for purchase, either in-store or online.

Figure 3C:
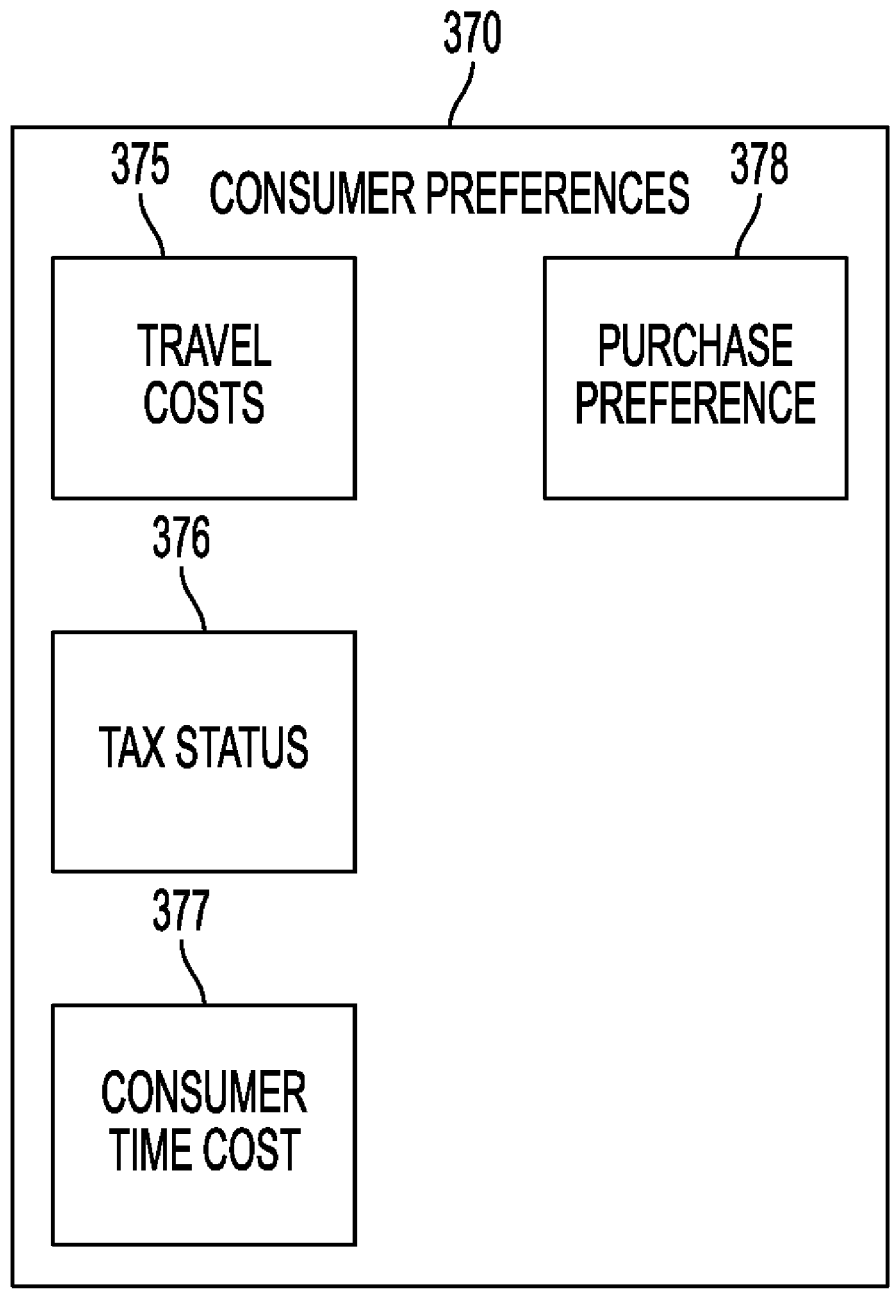
FIG. 3C is a block diagram of a user preferences data structure.

The retailer preferences 365 may specify any additional conditions, preferences, and/or requirements of the retailers 140. In one aspect, the retailers 140 may specify that they do not wish to compete against themselves. For example, Target may not wish to compete against Target.com's prices. The consumer preference database 315 processes and stores consumer preferences 370. As described supra with respect to FIG. 2, the consumer preferences influence the reverse auction server 300 such that the proper discount may be computed within the preferences disclosed by the consumer. The consumer preferences could be any number of factors as shown in FIG. 3C. For example, travel costs 375, tax status 376, consumer time cost 377, purchase preferences 378, etc. could all be stored and processed by the reverse auction server 300 by the reverse auction module 310, user preference database 315, or combination thereof. One of skill in the art will appreciate that the list of factors described in the depicted user preference 370 is not exhaustive and any number of similar factors may be utilized without departing from the functionality of the reverse auction server 300.

With reference to the factors disclosed in FIG. 3C, the travel costs 375 could be the costs associated with the consumer's travel. As previously stated in FIG. 2, the travel costs 375 could be the cost of gasoline, the wear-and-tear costs on the consumer's vehicle, road tolls, vehicle registration, vehicle insurance, public transportation costs, etc. In one aspect, the travel costs 375 could be received from a third-party server (not shown) based on the location of the wireless device 105. For example, the wireless device 105 could be located in New York City, transmit its location to the third-party server, and receive the travel costs 375 (e.g., local cost of gasoline, tolls, etc.). As will be shown in FIG. 4 and FIG. 5, with respect to the reverse auction purchase process 400, the travel costs 375 are taken into consideration by the reverse auction server 300 in order to calculate the potential discount available to the consumer.

The tax status 376 may be applicable to certain users who are tax exempt. Typically, in the United States, the tax charged on products 165 is based on the locations of the product 165 and the consumer, thus the tax status 376 of the actual consumer is generally inapplicable. However, in other countries, the tax status 376 of the consumer may be taken into consideration such that the product 165 may be more inexpensive/expensive to particular consumers due to the tax charged to the consumer. Thus, the tax status 376 of the consumer may affect the reverse auction process 500 under certain conditions.

The consumer time cost 377 is the cost the consumer believes their time is worth. Thus, the consumer time cost 377 is a subjective value that may change frequently and dynamically. In one aspect, the consumer could be very busy and thus highly value their leisure time. For example, the consumer could be a bailed former-Enron executive who only has two weeks before having to return to jail for trial. In such a situation, the former executive may consider his time very valuable, e.g., $700 per hour. The reverse auction server 300 may consider this high consumer time cost in its calculations of the applicable discount. In such a situation, the reverse auction server 300 may only present alternatives or discounts which are very close to the former-executive's current location in order to minimize wasted consumer time costs 377.

In another aspect, the consumer time costs 377 could be extremely low. For example, a mortgage-backed security rater may have a high amount of free time after being fired for failing to accurately rate securitized mortgage assets. Thus, the rater may have a low user time cost 377. In one aspect, his consumer time cost 377 could be $1 per hour. When the reverse auction server 300 calculates product alternatives and discounts, the reverse auction server 300 may present a number of options to the lender that require a long travel time which would consume a great deal of his low-valued leisure time. Stated differently, the rater has time to travel to purchase the product 165 at a lower price because his time is worthless since he is unemployed and willing to hunt for bargains. As such, the reverse auction server 300 might find more discounts for the rater instead of the executive.

The purchase preference 378 may be any preference related to purchasing in general. In one aspect, the purchase preference 378 could be particular store locations the consumer will or will not visit. For example, the consumer may be unwilling to travel to Beverly Hills, Calif. to purchase the product 165 because he does not want to run into his ex-wife and her new, moviestar lover. In another aspect, the consumer may specify particular retailers from which the consumer refuses to purchase goods. For example, the consumer may refuse to purchase goods from Unfair Trade Market, Inc. which is known for its unfair business practices, child labor exploitation, price fixing, stock price inflation, etc. In yet another aspect, the purchase preference 378 could simply be whether or not the consumer is willing to engage in an online transaction. For example, the consumer may have had identity theft problems in the past and be unwilling to give sensitive, financial data over the Internet 130. In sum, the purchase preference could be any number of factors related to the consumer's preferences with regard to how the product will be purchased. One of skill in the art may determine that different or entirely new purchase preferences 378 may be required to perform the reverse auction process 500 without deviating from the spirit and scope of this disclosure.

With reference back to FIG. 1, the user preferences 370 could be stored on the reverse auction server 300, the wireless device 105, and/or a third-party server (not shown). One of skill in the art may take into consideration the actual environment in which the reverse auction system 100 is deployed and customize the implementation. Such implementation details are beyond the scope of this disclosure and the locating of the user preferences 370 within the user preference module 205 (in the wireless device 105) or in the user preference database 315 (within the reverse auction server 300) may be determined by one of skill in the art when actually implementing the reverse auction system 100.

The mapping module 320 provides location-based services to the reverse auction server 300. In one aspect, the mapping module 320 ascertains the current location of the wireless device 105. For example, the wireless device 105 could scan an item using the scanning module 210. The location module 220 within the wireless device 105 could transmit the current location of the wireless device 105 along with any data gathered by the scanning module 210. Then, the reverse auction server 300 could receive the current location of the wireless device 105 along with any scanning data in order to identify the product. In one aspect, the location of the wireless device 105 may be useful in determining the identity of the product being scanned. For example, the wireless device 105 could be located in a retail tire store; the reverse auction server 300 could match the product 165 against the inventory of the tire store since the reverse auction server 300 would have a reasonable amount of confidence that the wireless device 105 had scanned a product related to tires.

Figure 3D:
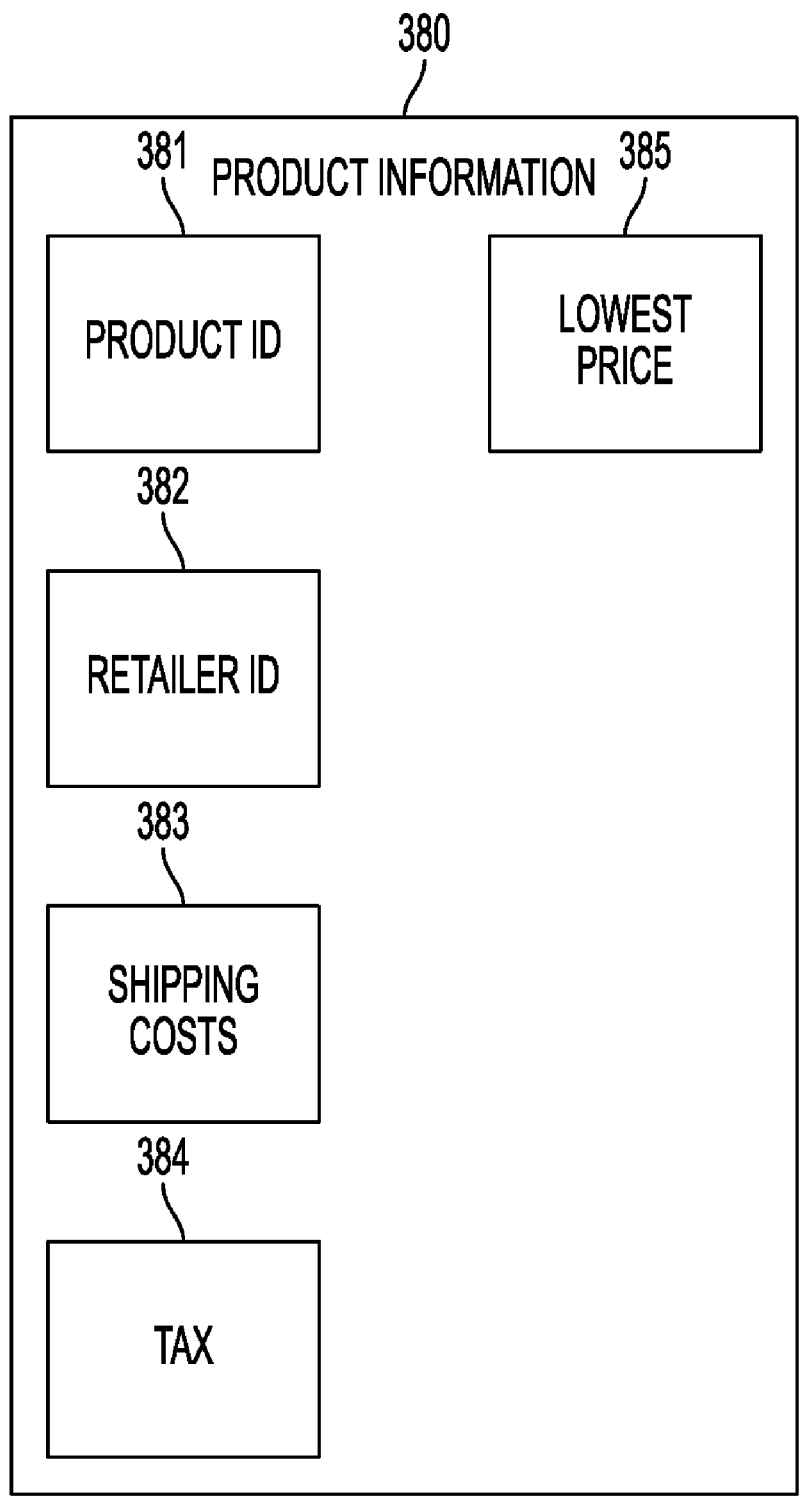
FIG. 3D is a block diagram of a product information data structure.

The product database 325 processes and stores product information 380. In one aspect, product information 380 is shown in FIG. 3D and could be utilized to store data about products managed by the reverse auction server 300. The product data 380 may contain a product ID 381, a retailer ID 382, a shipping cost 383, tax 384, and a lowest price 385. The product ID 381 is a unique ID utilized to identify the product 165. As previously stated with respect to the offered products database 355 in the retailer information 350 shown in FIG. 3B, the product ID 381 could be a relational reference back to the offered products database 355. One of skill in the art will appreciate that there are a nearly infinite number of permutations for a relational database configuration, many of which are functionally equivalent. The general understanding is that the product ID 381 uniquely identifies the product 165 and could be a propriety identification means utilized by the retailer or could be a universal, unique identification (e.g., an ISBN, UPC, etc.).

The retailer ID 382 is utilized to identify the retailer offering the product 165. The retailer ID 382 could be a relational reference back to the retailer information 350 from FIG. 3B in one aspect. As stated, one of skill in the art may configure the database differently depending on the implementation details.

Figure 5:
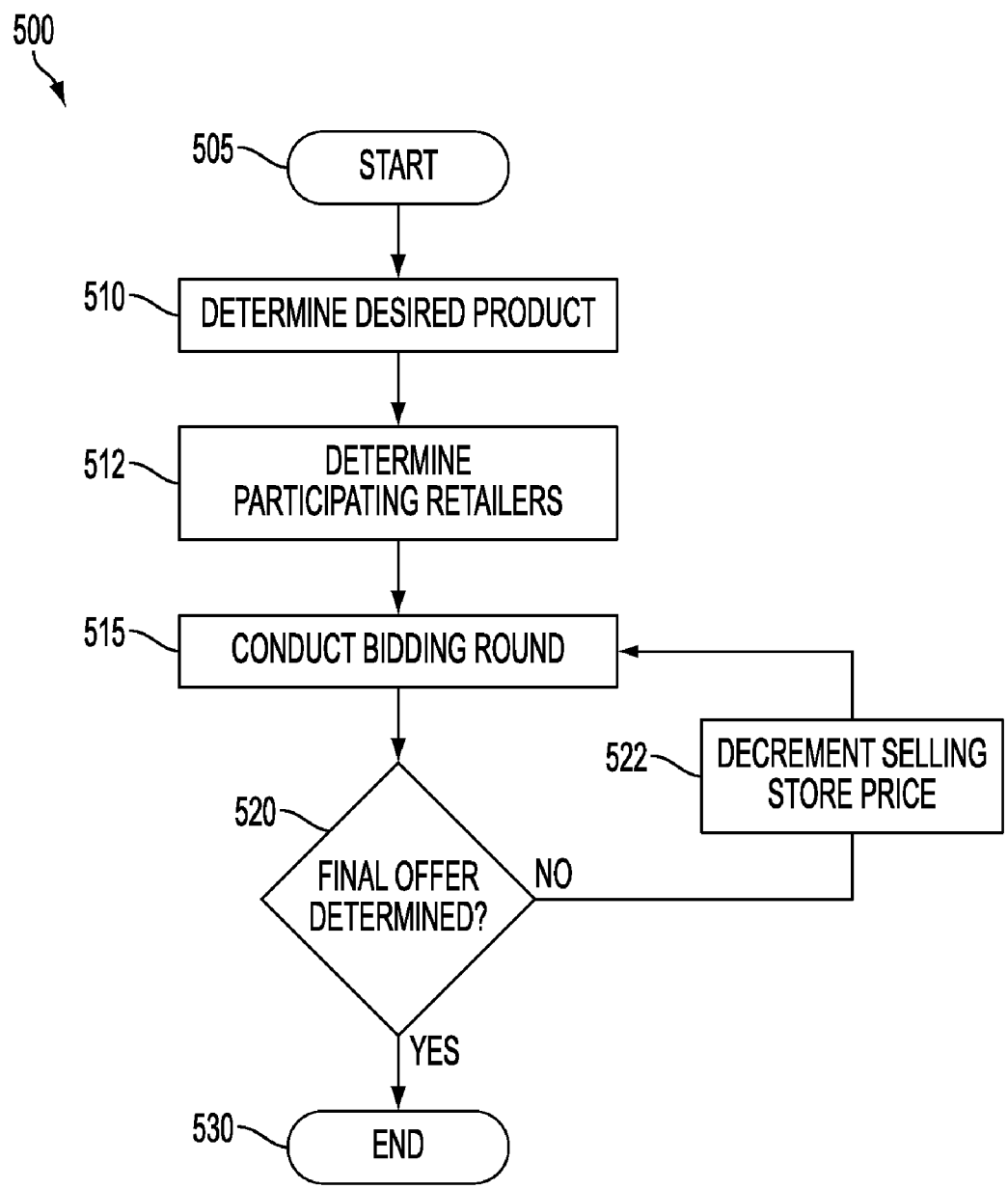
FIG. 5 is a flowchart of a reverse auction process.

The shipping costs 383 are any costs associated with shipping the product 165 to the consumer. The reverse auction process 500 as shown in FIG. 5 better illustrates how the reverse auction server 300 takes into consideration shipping costs 383 when conducting a reverse auction process 500. In one aspect, shipping costs 383 may be stored in the product information 380 and calculated based on virtually any destination provided by the consumer. For example, the consumer could have the product 165 shipped to her home, office, hotel, etc. One of skill in the art will appreciate that shipping costs 383 are highly dynamic and offered in a plurality of costs and duration (e.g., overnight, next day, next business day, parcel post, etc.). Thus, the shipping costs 383 could be calculated in a number of ways and presented to the consumer as an option during the reverse auction purchase process 400. In one aspect, the consumer could select the shipping type as a part of the consumer preference 370. For example, the consumer could have a consumer preference which indicates that the consumer always desires overnight shipping. When the reverse auction server 300 conducts the reverse auction process, the reverse auction server 300 may be able to calculate the cost of overnight shipping as part of the discount.

Tax 384 may be utilized by the reverse auction server 300 as part of the reverse auction process 500. In one aspect, some online retailers offer products which are tax exempt. In another aspect, some products have no tax associated with them under any circumstance (e.g., unprepared food items, prescriptions, etc.)

The product information 380 as depicted in FIG. 3D is not limiting and one of skill in the art may find additional data to be useful to the reverse auction process 500. For example, one of skill in the art may add product photos, descriptions, reviews, warranty information, etc.

Figure 4:
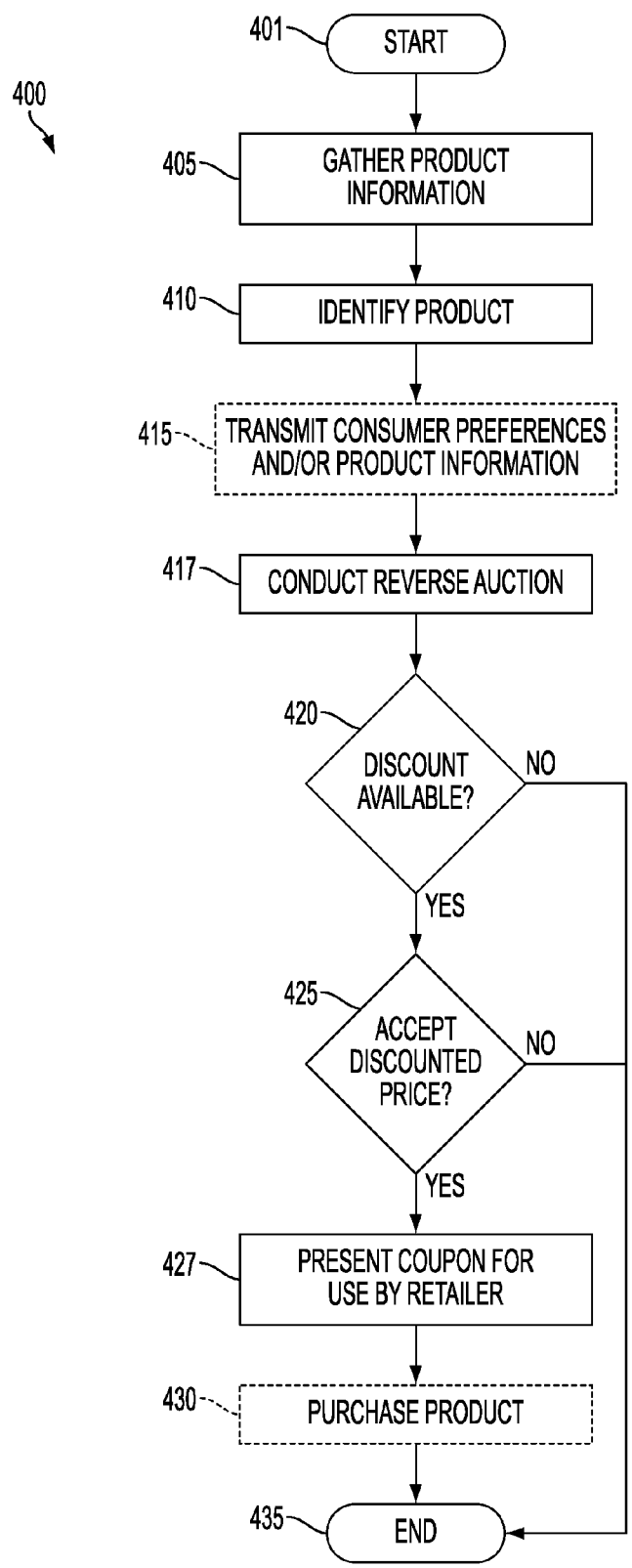
FIG. 4 is a flowchart of a reverse auction purchasing process.

FIG. 4 depicts a reverse auction purchasing process 400. The reverse auction purchasing process 400 generally illustrates the process by which a consumer may utilize the reverse auction process to receive a discount for the product 165.

The reverse auction purchasing process 400 begins at start block 401 and proceeds to block 405 where product information is gathered. In one aspect, the wireless device 105 utilizes the scanning module 210 to scan the product 165 which the consumer is considering for purchase. For example, the wireless device 105 could be equipped with a near-field communication device which could be coupled to the scanning module 210 such that product information 380 is transmitted wirelessly to the wireless device 105 from the product 165. Thus, the product 165 itself could contain information necessary to identify itself to the wireless device 105 or the reverse auction server 110. For instance, the product information 380 could be stored on a memory in the product 165 and read by the scanning module 210 in the wireless device 105.

In another aspect, the wireless device 105 could utilize a camera resident on the wireless device 105 such that a photograph of the product 165 may be captured. The reverse auction purchasing process 400 could proceed to block 410 where the captured photograph could be processed to determine the identity of the product 165. For example, the wireless device 105 could transmit the captured photograph to a third party server (not shown) for analysis and processing. One of skill in the art will appreciate that means exist to identify the product 165 by using image analysis. For example, the third-party server could use image recognition to find UPC barcodes on the product 165 and match the UPC barcode against a database of known UPC barcodes to ascertain the identity and source of the product 165. Alternatively, the third-party server could identify the labels of the product 165 shown in the captured photograph. For example, the third-party server may be trained to recognize famously known trademarks (e.g., Coke, Nike, Starbuck's, Apple, etc.). The reverse auction purchasing process 400 may rely on logic within the reverse auction server 110, the wireless device 105, or a third party server to analyze and determine the identity of the desired product 165.

Note that in the aspect where the product 165 itself contains the product information 380, the processing performed in block 410 is minimized because no image recognition or other analysis need be performed to determine the identity and source of the product, since the product information 380 was provided by the product 165 itself.

The reverse auction purchasing process 400 proceeds to block 415 where the consumer preferences 370 and/or product information 380 are communicated to the reverse auction server 110. Note that block 415 is denoted with a dotted line because this block may be optional. For instance, the consumer preferences 370 and/or product information 380 could already reside on the reverse auction server 110 (e.g., the consumer preferences 370 could have been received in advance by the consumer at home using a web application). As stated with respect to FIG. 3A, the consumer preference database 315 and/or the product database 325 could be stored on the reverse auction server 110. In one aspect, product information 380 may be determined completely within the reverse auction server 110 if the product 165 is identified by using image recognition. In such an aspect, product information 380 may not be sent by the wireless device 105 because the wireless device 105 is relying on the reverse auction server 110 (or a third-party server) to determine the identity of the product 165. One of skill in the art will appreciate that either the reverse auction server 110, the wireless device 105, or a third-party server (not shown) may gather and store the consumer preferences 370 and/or product information 380 (if such gathering is necessary).

The reverse auction purchasing process 400 proceeds to block 417 where the reverse auction server 110 conducts a reverse auction process. The reverse auction process may ascertain and offer any applicable discounts, coupons, or incentives to the consumer.

Upon returning from the reverse auction process, the reverse auction purchasing process 400 proceeds to decision block 420 where the ascertained discounts, coupons, and/or incentives may be transmitted to the wireless device 105. In one aspect, if the reverse auction process determines a discount is available, the reverse auction purchasing process 400 proceeds down the YES branch to decision block 425. Returning to block 420, if the reverse auction process determines no discounts are available for the desired product, then the reverse auction purchase process 400 proceeds down the NO branch to the end block 435. Returning back to decision block 420, if the consumer is being offered any coupons, these coupons may be received and stored in the coupon module 225 resident on the wireless device 105. The reverse auction purchasing process 400 proceeds down the YES branch to decision block 425 (if a discount is available).

At decision block 425, the wireless device 105 is presented with the option to accept the discount as calculated by the reverse auction process. In one aspect, the wireless device 105 presents the consumer with a list of options from which to choose. For example, the list of available offers could be similar to Table 1, infra.

TABLE 1

| Retailer | Offer | "Consumer Cost" | Factors Affecting "Consumer Cost" |
| --- | --- | --- | --- |
| Retailer A (141) | $182 | $195 | Retailer A (141) is located 20 miles away from current location. |
| Retailer B (142) | $188 | $195 | Retailer B (142) is online and will require 5 days to ship the product to consumer's desired shipping address. Tax-free if purchased in California. |
| Retailer C (143) | $190 | $196 | Retailer C (143) is located 10 miles away from current location. |
| Retailer D (144) | $200 | $200 | The wireless device 105 is currently located in Retailer D's (144) store. |

As shown in Table 1, supra, the participating retailers 140 have participated in the reverse auction process and made offers to the wireless device 105. In the first column, the name of the retailer is shown (e.g., retailer A (141) from FIG. 1, supra). Note that the list of retailers presented in Table 1 is not exhaustive and could be longer or shorter when actually implemented. Turning to the second column of Table 1, the offer is presented for each retailer from the first column. Note some retailers 140 may choose to not participate. However, as shown in Table 1, each retailer has made an offer to the wireless device 105 for the product 165. The offer represents the amount of money the retailer desires from the consumer in exchange for the goods. For example, Retailer A 141 requires $182 to complete the transaction.

Turning to the third column of Table 1, the "consumer cost" of the goods is also displayed to the wireless device 105. The consumer cost is calculated based on a number of variables affecting the purchase in question. The consumer cost may be affected by factors in the product information 380 from FIG. 3D, supra (e.g., shipping costs 383, tax 384, etc.). In another aspect, the consumer cost could be affected by the consumer preference 370 as shown in FIG. 3C, supra (e.g., travel costs 375, tax status 376, consumer time cost 377, etc.) Thus, the consumer cost is generally affected by costs that are in addition to the amount charged by the retailer (i.e., offer of the second column). The reverse auction process takes into consideration these additional costs (which affect the consumer cost) in order to calculate the offer. In addition, the consumer is better able to decide whether the proposed offer is truly an advantageous economic transaction, in part, due to the ability of the reverse auction process to calculate consumer costs.

Turning to the fourth column of Table 1, a plurality of messages may be presented in order to provide additional details about the purchase. For example, in the first row for retailer A 141, the purchase will require 20 miles of travel. One of skill in the art will appreciate that the messages presented in the fourth column could be anything relevant to the purchase, either for the consumer or the retailer, and the examples given above are not limiting but rather illustrative.

As stated, the consumer may be presented with a list of buying options similar to that shown in Table 1. The consumer may or may decide to accept any of the proposed offers. If the wireless device 105 declines the offers, then the reverse auction purchasing process 400 proceeds down the NO branch to end block 435 and the reverse auction purchasing process 400 terminates. Returning to decision block 425, if the wireless device 105 accepts at least one of the proposed offers from the retailers 140, then the reverse auction purchasing process 400 proceeds down the YES branch to block 427.

At block 427, the reverse auction purchasing process 400 may transmit additional discount information to the wireless device 105 to complete the transaction. On one aspect, a coupon may be sent to the wireless device's 105 coupon module 225. In this aspect, the wireless device 105 may store the coupon in the coupon module 225 for redemption at the retailer's register. For example, the coupon may allow the consumer to purchase the goods at the offer price as shown in Table 1, supra. Thus, if the retail price of the goods on the shelf was $200 at retailer D 144, and the offer from retailer A 141 was for $182, then the coupon would enable the consumer to purchase the goods from retailer A 141 for $182 (as opposed to what the shelf price would normally be at retailer A 141).

One of skill in the art will appreciate that coupons may take a number of forms, either physical or electronic. In one aspect, the coupon may be printed by a dedicated printer at the front of the store, available for pickup by the consumer prior to purchase.

In another aspect, the coupon could be shown on the wireless device 105 itself and operable to being scanned by the retailer's cash register. For example, the display of the wireless device 105 could present a barcode operable to being scanned by the retailer's register. In another aspect, the coupon could be stored in the coupon module 225 and communicated to the register using near-field communication. In yet another aspect, the coupon could be a code displayed or read aloud by the wireless device 105 and operable to being manually inputted by the retailer's employees operating the cash register. In yet another aspect, the entire transaction could take place within the wireless device 105 such that the consumer only pays the offer price, thus the coupon is intrinsically tied into the purchase. For example, the consumer could be presented with an option on the display of the wireless device 105 to automatically purchase the goods and have their credit card debited for the offer amount. In sum, there are a plurality of ways to present the coupon or discount to the consumer such that the consumer may take advantage of the offer as calculated by the reverse auction process. One of skill in the art may implement the couponing aspect slightly differently without departing from the spirit and scope of this disclosure.

The reverse auction purchasing process 400 proceeds to block 430 where the wireless device 105 may purchase the product 165. In one aspect, the goods could be purchased by using the wireless device 105. For example, the wireless device 105 could accept a retailer's offer and invoke a credit card transaction similarly to how Internet purchases are currently conducted. In another aspect, a coupon could be made available on the wireless device 105, and the coupon could be redeemed at the retailer when purchasing the goods at the cash register. Once the goods have been purchased, the reverse auction purchasing process 400 proceeds to the end block 435 and terminates.

FIG. 5 depicts the reverse auction process 500. In one aspect, the reverse auction process 500 is executed on the reverse auction server 110, either in a software or hardware implementation. One of skill in the art will appreciate that the reverse auction process 500 may be implemented to execute on the wireless device 105 or a third-party server (not shown). In one aspect, the reverse auction process 500 may be implemented within the reverse auction logic 310 within the reverse auction server 110 as shown in FIG. 3A, supra.

Beginning at start block 505, the reverse auction process 500 proceeds to block 510 and determines which product 165 are participating in the reverse auction process 500. Turning back to FIG. 4, the reverse auction purchasing process 400 may be invoked and influenced by decisions made on the wireless device 105. One of these decisions is which product the consumer is considering for purchase. In FIG. 4, the selection of the product 165 occurs in blocks 405, 410, and 415, discussed supra. In one aspect, the reverse auction process 500 receives this product selection as input at block 510. The reverse auction process 500 may search for the product 165 within the product database 325 of the reverse auction server 110, as shown in FIG. 3A, supra. In one aspect, the product information 380 is utilized as shown in FIG. 3D, supra. For example, the reverse auction server 110 may invoke the reverse auction process 500 and search within the product database 325 for a product ID 381. The product ID 381 could then be used to determine related information about the product 165 (e.g., lowest price 385, shipping costs 383, tax 384, etc.). One of skill in the art will appreciate that a number of ways exist to search for items in a database.

Once the product 165 is determined, the reverse auction process 500 proceeds to block 512 where the reverse auction process 500 determines which retailers 140 wish to participate in the reverse auction process 500. In one aspect, less than all the retailers 140 may participate in the reverse auction process 500. For example, retailer A 141 and retailer D 144 may participate while retailer B 142 and retailer C 143 do not participate. In one aspect, the retailers 140 could indicate their willingness to participate by setting appropriate flags within the retailer information's 350 offered products database 355. For instance, the retailer A 141 could specify that a subset of its total offered goods are available for the reverse auction process 500. For instance, if the retailer A 141 is offering a highly demanded product (e.g., the Nintendo® Wii), then retailer A 141 may not be willing to offer that product via the reverse auction process 500 because retailer A 141 does not desire to offer a discount as it is not necessary to sell a highly demanded product.

In another aspect, the retailers 140 may specify that they are currently out of stock for the selected product and thus cannot participate in the reverse auction process 500. However, one of skill in the art will appreciate that a raincheck offer could be accounted for by the reverse auction process 500 (and the raincheck status displayed in the fourth column of Table 1, supra). Tracking the inventory of the retailers 140 enables the reverse auction process 500 to adapt dynamically to changing market conditions within the retailers 140. In one aspect, as the inventory diminishes, the retailers 140 could increase their lowest price 385 within the product information 380. Conversely, if inventory were to rise, the retailers 140 could dynamically decrease their lowest price 385 to decrease inventory. One of skill in the art may implement additional conditions, actions, and reactions within the reverse auction logic 310 without departing from the spirit and scope of this invention.

In yet another aspect, the purchase preferences 378 (as shown in FIG. 3C, supra) may be considered by the reverse auction server 110. As previously stated, if the consumer has an aversion to online shopping and has indicated such via the purchase preferences 378, then the reverse auction server 110 may prevent online retailers from participating in the reverse auction process 500.

In still another aspect, the reverse auction server 110 may consider situations where retailers 140 specify whether or not they wish to participate in the reverse auction process 500. In one aspect, retailers 140 may not desire to compete against themselves. For example, retailer A 141 could be Wal-Mart® and retailer B 142 could be WalMart.com. In one aspect, Wal-Mart® may indicate in the retailer preferences 365 (from FIG. 3B, supra) that Wal-Mart® does not wish to bid against its online counterpart. As such, WalMart.com (i.e. retailer B 142 in this example) may be excluded from the reverse auction process 500. In another aspect, the retailers 140 could specify that they do not wish to compete against online retailers altogether. In another aspect, the retailers 140 could specify a limited region in which they wish to participate in the reverse auction process 500. For example, a United States retailer may be attempting to increase its presence in Mexico and therefore only be willing to participate in reverse auctions originating from Mexico.

Proceeding to block 515, the reverse auction process 500 conducts the first round of bidding. To better illustrate the reverse auction process 500, the following non-limiting scenario is presented. Assume that the consumer has found a digital camera in retailer A's 141 store. The digital camera is marked with a store price of $210. In one aspect, the store price is defined as a seeding store price because the seeding store price will be utilized to bootstrap the first round of bidding. Thus, the seeding store price is $210 in this example. The consumer may then utilize her wireless device 105 to invoke the reverse auction purchasing process 400 (as shown in FIG. 4, supra) in order to find better offers. Retailer B 142, retailer C 143, and retailer D 144 then proceed to participate in the reverse auction process 500 to try and beat retailer A's 141 store price. Each of the retailers 140 have specific criteria and factors established in the reverse auction server 110 in order to control their potential behavior during the reverse auction process 500, as described infra and will be described supra. Table 2, infra, illustrates a typical set of values the retailers 140 may set in advance of the first round of bidding.

TABLE 2

| Retailer | Lowest Price | Distance | Fuel Cost | Consumer time cost |
|---|---|---|---|---|
| Retailer A | $200 | 0 | $0 | $0 |
| Retailer B | $190 | 10 miles | $4 | $2 |
| Retailer C | $180 | 20 miles | $8 | $4 |
| Retailer D | $188 | Online | $0 | $7 |

As shown in Table 2, the retailers 140 have varying lowest prices 385 for the selected product 165. Note further that the shown lowest prices are lower than the current street price of $210 currently being offered to the consumer, even for retailer A 141 who has a lowest price 385 of $200. The lowest price 385 shown in the second column reflects, in one aspect, the lowest price the retailer will accept for the product 165 while still making a profit. In another aspect, the lowest price 385 could result in little or no profit because the retailer simply wishes to reduce inventory and reallocate the available shelf-space.

The third column of Table 2 may show the distance from the wireless device's 105 current position to the retailer. For example, retailer B 142 is 10 miles away from the current position of the wireless device 105. In another aspect, the distance could be calculated based on the retailer's street address instead of the actual position of the wireless device 105. Note that the distance for retailer D 144 is not applicable because retailer D 144 represents an online offering and thus no distance is associated with purchasing the product 165 from retailer D 144.

Turning to the fourth column of Table 2, the fuel cost represents the cost associated with purchasing the goods at the retailer. In one aspect, the fuel cost could be calculated from the travel costs 375 as provided by the consumer preference 370 from FIG. 3C, supra. Note that retailer D 144 has no fuel costs associated with the selected product because the purchase is online and the consumer is not required to travel and thus will not incur fuel charges, vehicle maintenance, tolls, public transportation costs, etc.

The fifth column of Table 2 shows the consumer time cost 377 associated with visiting each of the retailers 140. As previously stated in FIG. 3C, the consumer time cost 377 may be stored as in the consumer preference 370 and utilized by the reverse auction process 500 to calculate any potential offers. In one aspect, the consumer time cost 377 represents the consumer's subjective value of her time consumed by having to purchase the product 165 from an alternative retailer. In this example, the consumer believes that she should be compensated $2 to visit retailer B 142 because visiting retailer B 142 will require some travel and time. Note the associated consumer time cost 377 for retailer C 143 is double that of retailer B 142 because, in part, retailer C 143 is twice as far from the consumer's current location (thus requiring double the travel time). Finally, retailer D 144 has a user time cost 377 of $7. In this particular example, the consumer has indicated that having to wait for an online delivery is not unacceptable but affects the consumer time cost because of the waiting involved with online purchases. In another aspect, the consumer may simply feel that online purchases are undesirable (e.g., due to potential for fraud, etc.) and as such would like to be compensated in the form of a discount. In sum, the consumer time cost may relate to a host of objective and subjective costs related to the purchase of the product 165.

Turning back to Table 1, supra, one of skill in the art will appreciate that the fuel cost and consumer time cost shown in Table 2 correlate to the consumer costs of Table 1. Thus, even if the retailers 140 were to offer the product at their lowest price, the consumer costs (in this example, fuel cost and consumer time cost) would have to be accounted for by the consumer.

The reverse auction process 500 conducts the first round of bidding using Equation 1, infra.

$$\text{Offer}_{Retailer} = \text{Seeding Store Price} - (\text{Consumer Costs}_{Retailer} + \text{Bid Increment}) \quad \text{EQUATION 1:}$$

As shown in Equation 1, the Offer$_{Retailer}$ is retailer-specific. Thus, the Offer$_{Retailer}$ will be calculated for each participating retailer (i.e., retailer A 141, retailer B 142, etc.), respectively. As previously stated, the Seeding Store Price is the initial store price the consumer viewed in the store (i.e. the seeding store price may be based on the street price in one aspect). The reverse auction server 110 is attempting to beat this seeding store price by having the retailers 140 present offers via the reverse auction process 500.

The Consumer Costs$_{Retailer}$ may correspond to any costs extrinsic to the purchasing of the goods (e.g., travel costs 375, time costs 377, etc.). The Bid Increment may be utilized as a catalyst to cause each subsequent bid to further each round. In one aspect, the Bid Increment could be as little as $0.01. In another aspect, the Bid Increment could be as high as $1,000,000.00. One of skill in the art will appreciate that a lower Bid Increment value may lead to more bidding rounds having to be conducted until the final offer is determined. Further, one of skill in the art will appreciate that an extremely high Bid Increment may prevent subsequent bids from being effective (i.e., the Bid Increment may be so large as to create a negative price). Thus, having a low Bid Increment will ensure that the reverse auction process 500 reaches a final offer but may have an undesirably high number of bidding rounds.

Table 3, infra, shows an exemplary first bidding round based on Equation 1.

TABLE 3

| Retailer | Offer$_{Retailer}$ | Seeding Store Price | Consumer Costs$_{Retailer}$ | Bid Increment |
|---|---|---|---|---|
| Retailer A | $210 | $210 | $ 0 | N/A |
| Retailer B | $203 | $210 | $ 6 | $1 |
| Retailer C | $197 | $210 | $12 | $1 |
| Retailer D | $202 | $210 | $ 7 | $1 |

As shown in Table 3, retailer A 141 has no consumer costs associated with purchasing the product 165 from its store. In this example, there are no consumer costs because the consumer is standing in front of the product 165 and willing to buy. No travel costs 375, consumer time costs 377 or purchase preferences 378 (as shown in FIG. 3C) are adding to the consumer costs of Table 3. The bid increment for retailer A 141 is not applicable because retailer A 141 does not participate in the bidding process in the first bidding round. Retailer B 142, retailer C 143, and retailer D 144 respectively calculate their offers based on Equation 1, supra. As previously stated, the reverse auction server 110 is attempting to have retailer B 142, retailer C 143, and retailer D 144 beat retailer A's 141 store price.

The reverse auction process 500 proceeds to decision block 520 where the reverse auction process 500 determines if a final offer has been found. In one aspect, the final offer is determined when only one retailer remains in the bidding process. For example, if retailer C 143 were to offer a price lower than the lowest price 385 of any other retailers, then retailer C's 143 offer would be the final offer. Note that the final offer may in many instances not be the lowest price 385 for the retailers 140. Thus, the reverse auction process 500 may present a price lower than the street price but one still above the lowest price 385 for the retailer. Therefore, the retailer may still receive a profit even though a discount was given.

If the final offer has not been determined, the reverse auction process 500 proceeds along the NO branch to the block 522 where another round of bidding is anticipated. At block 522, the Seeding Store Price is updated. In one aspect, each subsequent round of bidding utilizes Equation 1, supra; however, the Seeding Store Price may be decremented by the bid increment. Thus, in this example, the Seeding Store Price would be $209, which represents the Seeding Store Price from the first bidding round minus the bid increment. Based on Equation 1, supra, the following Table 4 depicts an exemplary series of bidding rounds being conducted. Note how the offer (i.e., Seeding Store Price) of retailer A 141 is decremented by the bidding amount each round (as shown in the second column of Table 4, infra).

TABLE 4

| Bidding Round | Retailer A | Retailer B | Retailer C | Retailer D |
| --- | --- | --- | --- | --- |
| 1 | $210 | $203 | $197 | $202 |
| 2 | $209 | $202 | $196 | $201 |
| 3 | $208 | $201 | $195 | $200 |
| 4 | $207 | $200 | $194 | $199 |
| 5 | $206 | $199 | $193 | $198 |
| 6 | $205 | $198 | $192 | $197 |
| 7 | $204 | $197 | $191 | $196 |
| 8 | $203 | $196 | $190 | $195 |
| 9 | $202 | $195 | $189 | $194 |
| 10 | $201 | $194 | $188 | $193 |
| 11 | $200 | $193 | $187 | $192 |
| 12 | — | $192 | $186 | $191 |
| 13 | — | $191 | $185 | $190 |
| 14 | — | $190 | $184 | $189 |
| 15 | — | — | $183 | $188 |
| 16 | — | — | $182 | — |

Note that retailer A 141 stops participating in the reverse auction process 500 once the offer would go below the lowest price 385. Thus, during the twelfth round, only retailer B 142, retailer C 143, and retailer D 144 are participating in the reverse auction process 500. During the sixteenth round, retailer C 143 is the only remaining retailer and thus the bidding ceases. Note that the offer given by retailer C 143 is not the lowest price 385 but rather one which might entice the consumer to leave retailer A's 141 store and visit retailer C's 143 store.

Returning to block 520, if the final offer has been determined, the reverse auction process 500 proceeds down the YES branch to end block 525 at which point the reverse auction process 500 terminates. In one aspect, the reverse auction purchase process 400 resumes control at block 420, as previously described supra.

Figure 6A:
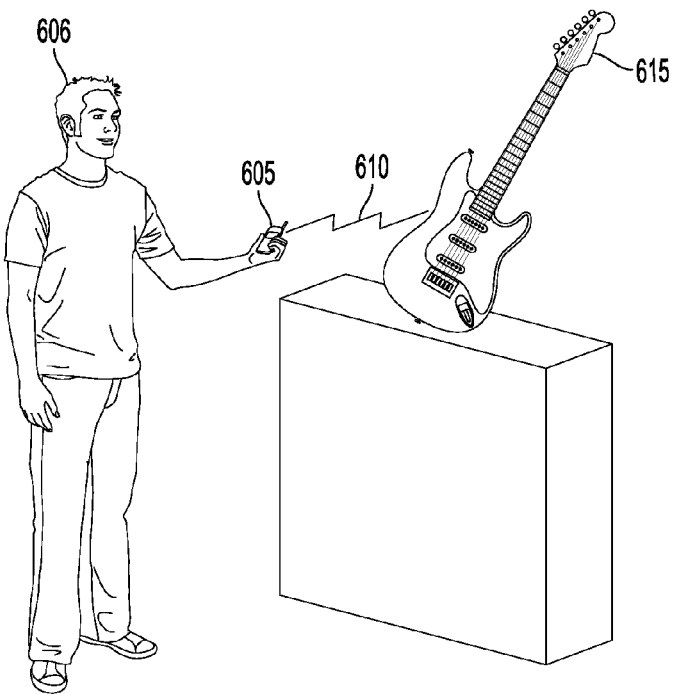
FIG. 6A is an illustration depicting a consumer purchasing goods.

FIGS. 6A through 6G depict an exemplary shopping experience using the reverse auction system 100. Turning to FIG. 6A, a consumer 606 is shown browsing goods in a retailer A's 141 music department. The consumer 606 is holding a wireless device 605 and preparing to use the wireless device 605 to scan the goods in the store to obtain information, determine prices, in-store inventory, product reviews, similar/alternative products, etc. A link 610 is shown connecting the wireless device 605 to a heavy metal guitar 615. The link 610 could utilize any of the same technologies which the links 101, 103, 135, 150, 151, 152, 153 utilize, supra. In one aspect, the link 610 is performed by near-field communication between the heavy metal guitar 615 and the wireless device 605 as stated above with respect to the link 160 in FIG. 1, supra. In another aspect, the link 160 could represent the wireless device 605 taking a photograph and performing image recognition as described supra.

Figure 6B:
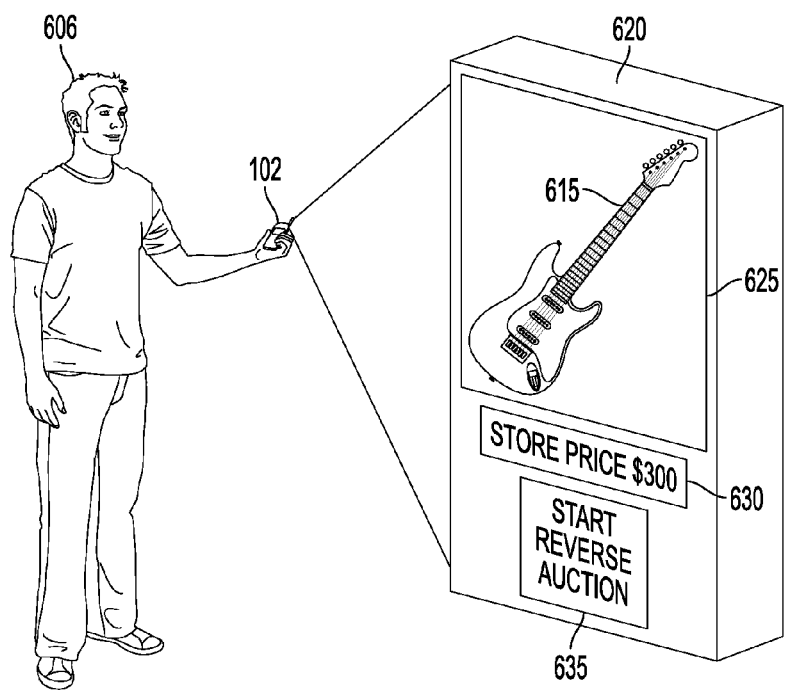
FIG. 6B is an illustration depicting a consumer invoking the reverse auction process.

Turning to FIG. 6B, the consumer 606 is actively scanning goods in retailer A's 141 store. In one aspect, the display of the wireless device 605 renders a screen 620. Within the screen 620, an image 625 of the heavy metal guitar 615 is shown. A store price 630 of $300 and a button 635 to invoke the reverse auction process 500 is displayed within the screen 620. One of skill in the art will appreciate that the screen 620 may contain additional information not shown, for example, in-store inventory, alternative buying options (e.g., color, size, quantity, etc.), consumer reviews, last time item viewed, weight, dimensions, alternative brands (e.g., generic vs. named brands), etc.

Figure 6C:
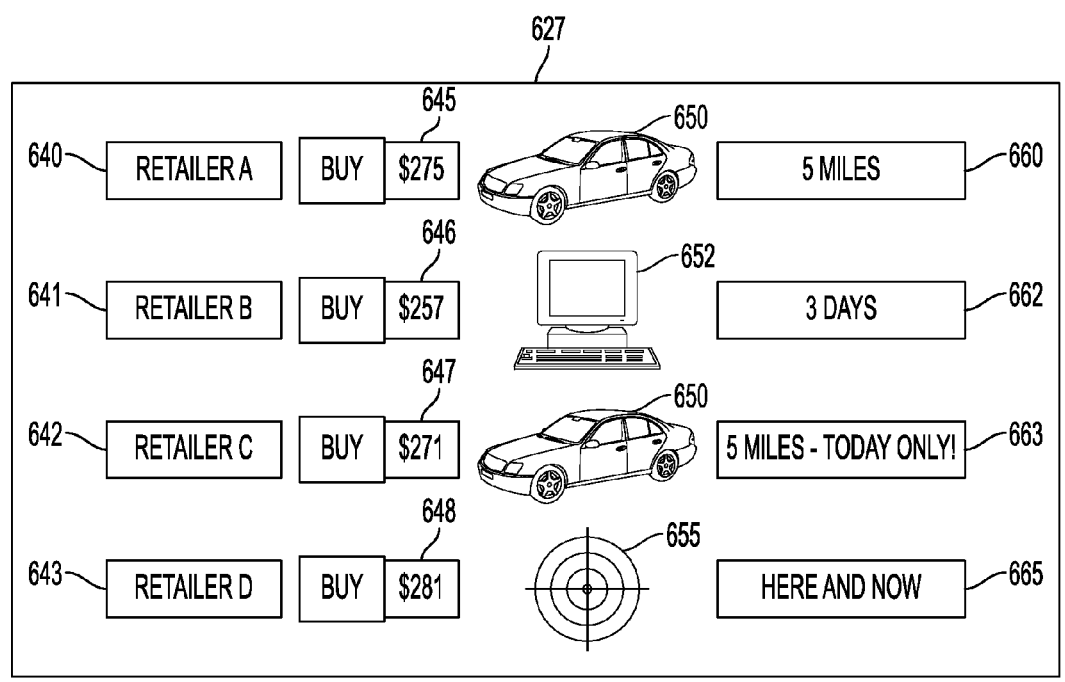
FIG. 6C is an illustration of a display used in a reverse auction process.

Turning to FIG. 6C, the consumer 606 invokes the reverse auction process 500 by pressing the start reverse auction button 635. A screen 627 may be shown on the display of the wireless device 605. A plurality of retailers 140 are shown on the screen 627: a retailer A 141 label 640, a retailer B 142 label 641, a retailer C 143 label 642, and a retailer D 144 label 643. Next to each retailer is a buying option which contains the price and a button to purchase the product 165 from the respective retailer at the respective price. The screen 627 contains a $275 buying button 645 for retailer A 141, a $257 buying button 646 for retailer B 142, a $271 buying button 647 for retailer C 143, and a $281 buying button 648 for retailer D 144.

In one aspect, a plurality of icons are shown next to each of the retailers based on the real-world costs associated with purchasing the heavy metal guitar 615 from each respective retailer. For example, a car icon 650 is shown next to retailer A 141 and retailer C 143 because purchasing the heavy metal guitar 615 from those retailers requires travel by car. A computer icon 652 could be displayed next to retailers which require an online purchase to obtain a discount. For example, retailer B 142 may require an online purchase to receive the price of $257. A bullseye icon 655 could be shown to indicate that the offer is valid for the store in which the consumer 606 is currently located. For example, retailer D 144 (which operates the store in which the consumer 606 is browsing guitars) has indicated with the bullseye icon 655 that the offer of $281 is valid within retailer D's 144 store. One of skill in the art will appreciate that additional, yet similar, icons may be operable to convey information regarding the purchase to the consumer 606.

In one aspect, a message may appear next to each offer presented by each retailer as shown by a plurality of message boxes 660, 662, 663, 665. The message box 660 indicates that the consumer 606 would have to travel five miles to purchase the heavy metal guitar 615 for $275 from retailer A 141. Likewise, the message box 662 could indicate that a purchase from retailer B 142 (which is online) would require 3 days of shipping. The message box 663 for retailer C 143 shows that additional information could be included in the message box 663. For example, a message indicating that the offer is limited by time or duration e.g. "today only!" Finally, with respect to the message box 665, a message of "here and now" could indicate to the consumer 606 that the offer is valid for the store in which the consumer 606 is currently located i.e. retailer D's 144 store. One of skill in the art will appreciate that virtually any relevant message could appear in the plurality of message boxes 660, 662, 663, 665.

Figure 6D:
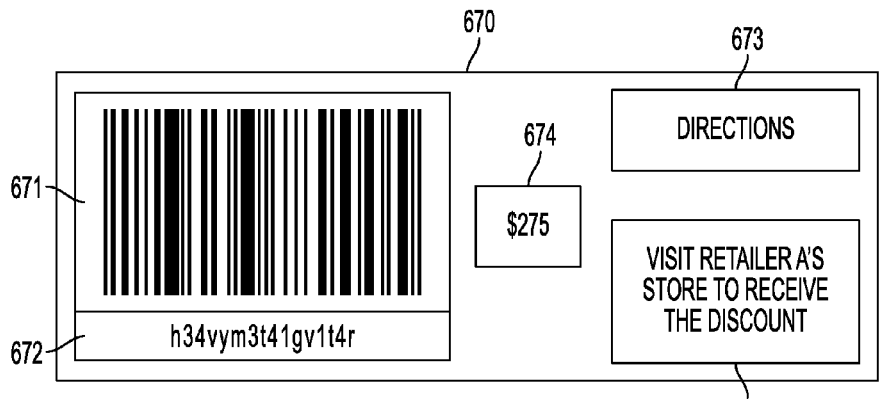
FIG. 6D is an illustration of a coupon.
Figure 6E:
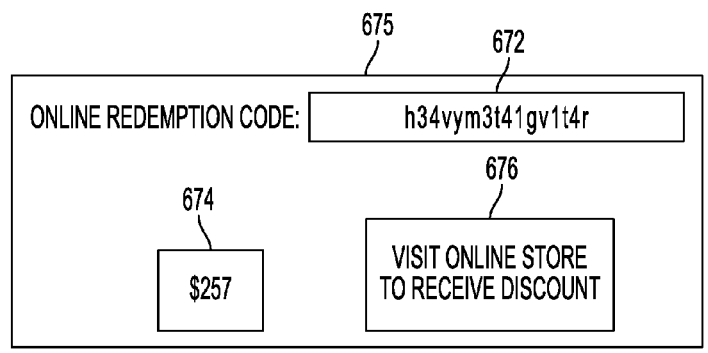
FIG. 6E is an illustration of a redemption code.
Figure 6F:
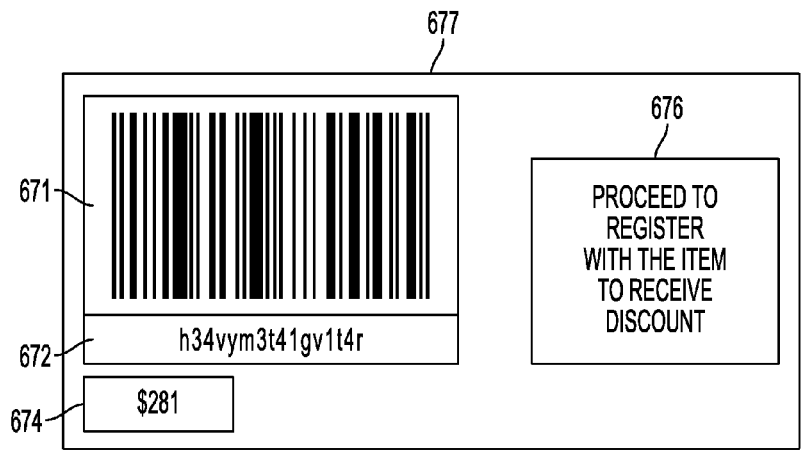
FIG. 6F is an illustration of a yet another coupon.

FIGS. 6D through 6F depict how the display would change once the consumer 606 has selected each of the various retailer's offers as presented in FIG. 6C, supra. Each figure will be described in turn infra. One of skill in the art will appreciate that the layouts of any of the screens described infra could be altered without departing from the spirit and scope of this invention. Discussing all possible permutations of a user interface for purchasing items is beyond the scope of this disclosure; however, one skilled in the art will appreciate the purpose and function illustrated by the following exemplary screens.

Figure 7:
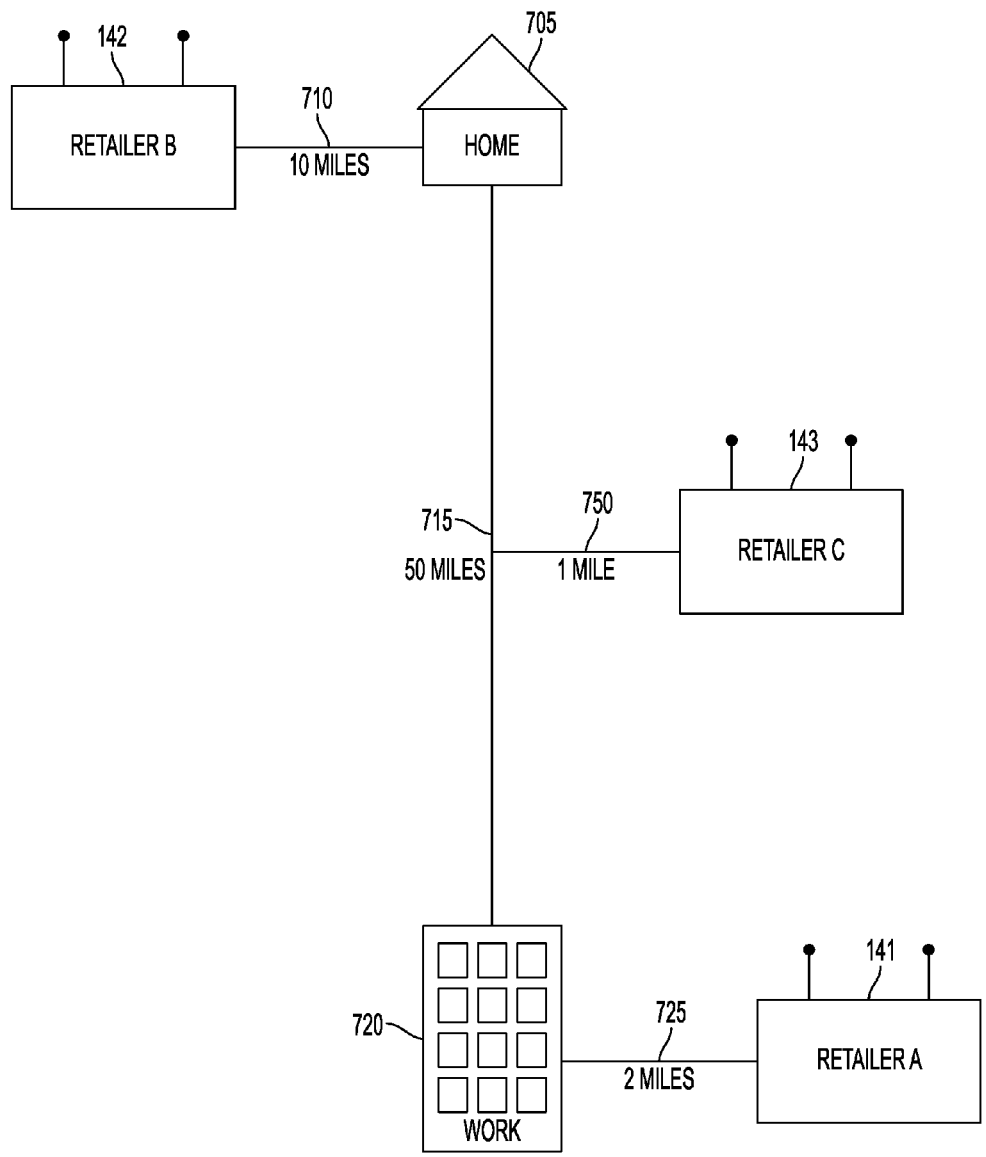
FIG. 7 is an illustration of locations, routes, and retailers on a map.

Turning to FIG. 6D, a screen 670 is shown after the consumer 606 has selected retailer A's 141 offer from the screen 627 shown in FIG. 6C. A barcode 371 may be presented which is operable to being scanned at retailer A's 141 cash register. A redemption code 672 may alternatively or additionally be shown. For example, the retailer's employees could manually input the code to calculate the discount. In one aspect, the cash register at the retailer communicates with the reverse auction server 110 to determine the discount. A directions button 673 may be shown and operable to allow the consumer 606 to request directions to retailer A's 141 location. For example, pressing the directions button 673 may cause the wireless device 605 to utilize the location module 220 as shown in FIG. 2, supra. In one aspect, the location module 220 could communicate with the reverse auction server's 110 mapping module 320 (as shown in FIG. 3A, supra) to determine and plan a route from the consumer's 606 current location to the location of retailer A 141. An exemplary scenario in which the consumer may utilize the directions button 673 is illustrated in FIG. 7 (infra) as well.

A message box 676 may be present which shows any additional instructions for the consumer 606. For example, as shown in the screen 670, the message box 676 displays instructions to "visit retailer A's store to receive the discount." In one aspect, the instructions could be presented via audio or video. For example, a multimedia clip could present a short advertisement containing instructions to persuade the consumer 606 to follow through with the purchase.

Turning to FIG. 6E, a screen 675 is shown after the consumer 606 has selected the offer from retailer B 641 in FIG. 6C, supra. The price 674 in the amount of $257 is shown. The message box 676 displays a message stating, "visit online store to receive discount." In one aspect, the message box 676 could be selected and cause the web browser on the wireless device to open. Further, the web browser could automatically navigate to the correct webpage on retailer B's 142 online store. In addition, the redemption code 672 could automatically be transmitted to retailer B's 142 online store. For instance, the redemption code 672 could be included in the URL as a parameter.

Turning to FIG. 6F, a screen 677 is displayed on the wireless device 605 after the consumer 606 has selected retailer D's 144 offer from FIG. 6C, supra. The screen 677 is very similar to the screen 670 depicted in FIG. 6D. However, the instructions presented in the message box 676 state, "proceed to the register with the item to receive the discount." Also, the price 674 has been updated to $281, the offer made by retailer D 144 in FIG. 6C, supra.

Figure 6G:
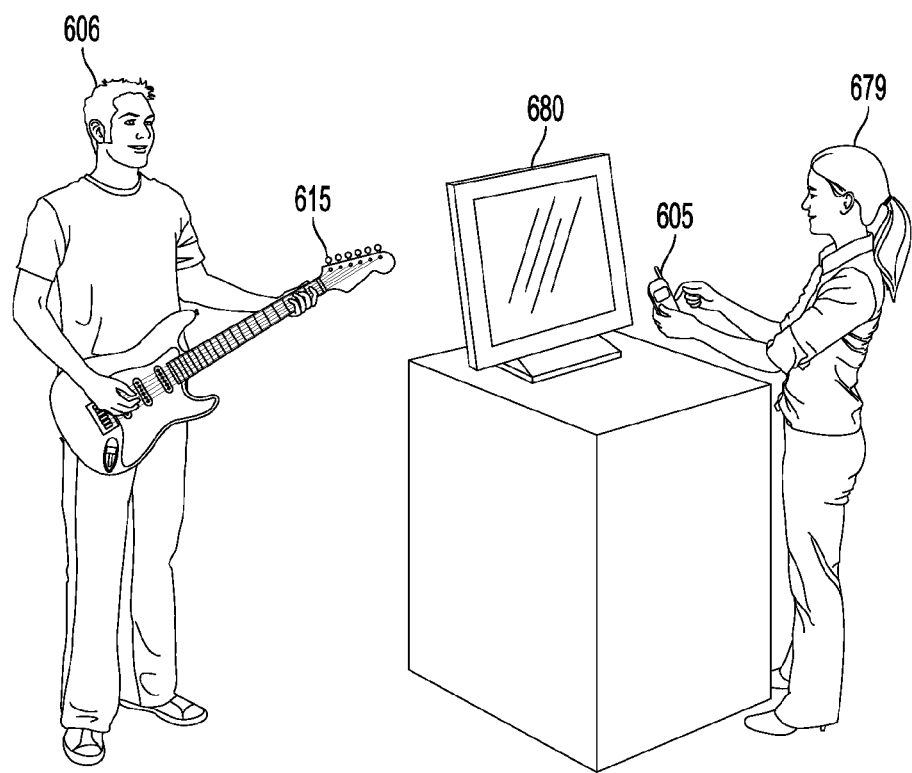
FIG. 6G is an illustration of a user purchasing a product.

FIG. 6G illustrates the consumer 606 purchasing the heavy metal guitar 615 based on the offer from retailer D 144 as presented in FIG. 6C, supra. Further, the consumer 606 has been presented with a screen substantially similar to the screen 677 in FIG. 6F, supra. An employee 679 of retailer D 144 may take the wireless device and scan the display of the wireless device 605 such that the barcode 671 is read from the wireless device 605 by a cash register 680. In one aspect, funds are automatically deducted from the consumer's 606 bank account or credit card account to pay for the heavy metal guitar 615. In another aspect, the consumer 606 could simply pay with cash, check or credit card using a standard point-of-sale terminal, as commonly deployed in the United States and Western Europe. In another aspect, the selection of the offer in FIG. 6F could cause a paper coupon to be printed at the cash register 680, which could be collected by the consumer 606 concurrently at the time of purchase.

FIG. 7 depicts dynamic travel costs 375 associated with the reverse auction system 100. In one aspect, the location module 220 may communicate the current location of the wireless device 605. Further, the reverse auction server 110 may dynamically update the travel costs 375 associated with the consumer having to visit retailers 140. For example, assume the wireless device 605 is aware of the consumer's daily commute to work and accordingly plots a route 715 to and from home using GPS. As shown in FIG. 7, a home location 705 is where the consumer resides. The consumer may commute fifty miles to work along the route 715 to a work location 720. Retailer A 141 is located two miles away from the work location 720 and may be visited by traveling on a route 725. Similarly, retailer B 142 is located ten miles away from the home location 705 and may be visited by a route 710. Finally, retailer C 143 is located near the route 715 and may be visited via a route 750 from the route 715. In this example, the route 750 is one mile long as measured from the route 715 to retailer C 143.

In one aspect, the travel costs 375 of the consumer preferences 370 could be calculated dynamically. For example, the reverse auction server 110 could utilize the mapping module 320 to determine the "consumer cost" to the consumer to visit retailer A 141 is not fifty-two miles (the total distance over the route 715 and the route 725, fifty and two miles, respectively). Rather, the reverse auction server 110 could determine that the travel costs 375 should be based simply on the distance from the work location 720 to the retailer A along the route 725 since the consumer will eventually visit the work location. Thus, when retailer A 141 and retailer B 142 are compared, retailer A will be considered closer even though retailer A 141 is physically farther from the home location 705.

In another aspect, the mapping module 320 could calculate retail locations along the consumer's planned routes. For example, retailer C 143 is located one mile from the midpoint of the consumer's commuting route 715. In this example, the reverse auction server 110 could notify the consumer that retailer C 143 requires a stop-over along the consumer's commute to/from the home location 705. In this example, visiting retailer C 143 adds a negligible amount of consumer cost to the transaction because the consumer is likely to travel along the route 715 while commuting.

One of skill in the art will appreciate through the exemplary situation depicted in FIG. 7 that the travel costs 375 are dynamic and may be calculated based on the current location of the wireless, the future location of the wireless (e.g., the work location 720 at 8:00 a.m.), or the typical location of the wireless (e.g., along the route 715 Monday through Friday). Thus, the travel costs 375 may be highly dynamic based on the activity of the consumer, the wireless device 605, routes traveled, or the location of retailers. The reverse auction server 110 may take into consideration these dynamic travel costs 375 in determining offers as presented by the retailers 140.

Figure 8:
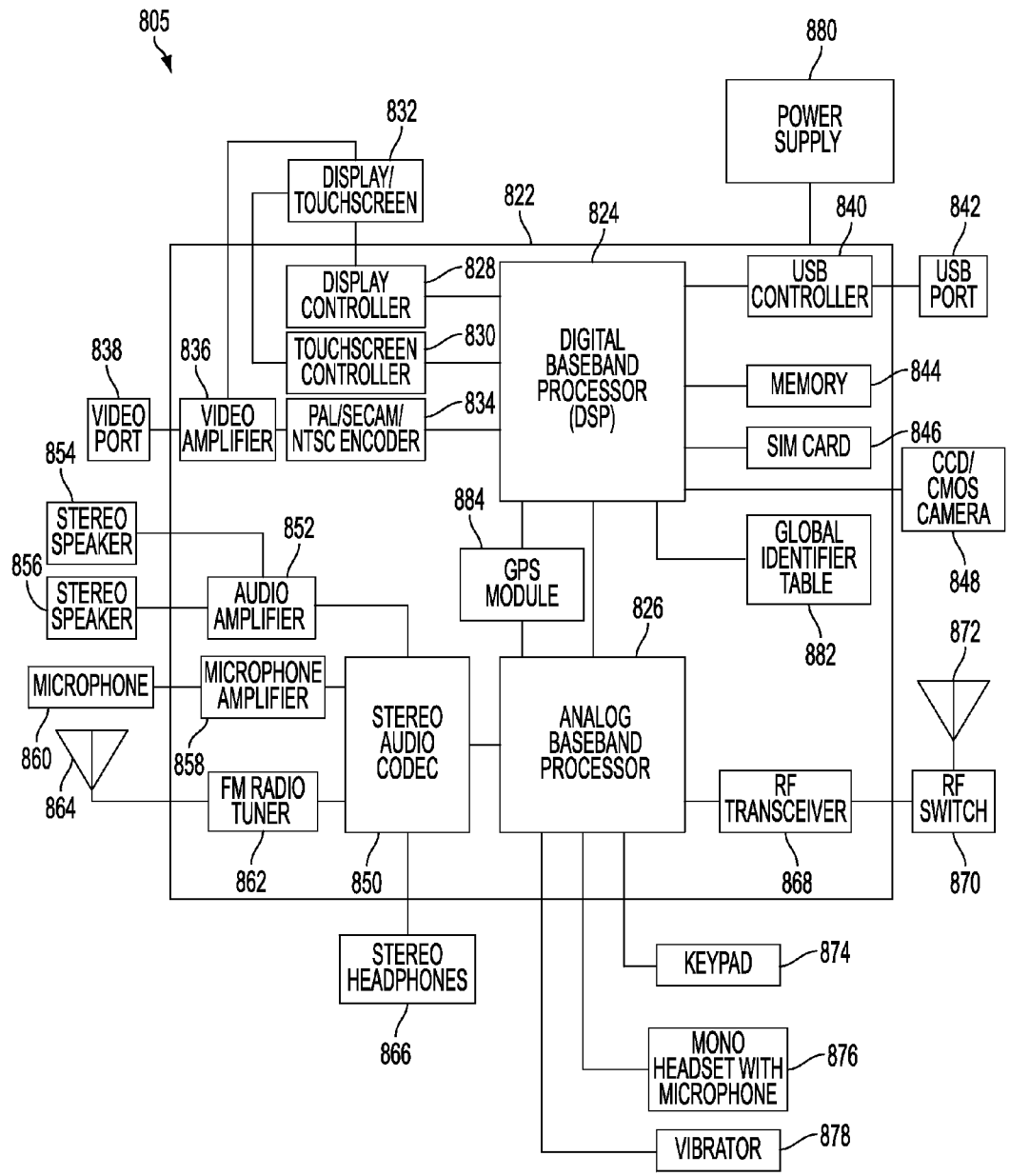
FIG. 8 is a block diagram of a wireless device.

Referring to FIG. 8, an exemplary, non-limiting aspect of the wireless device 805 is shown. As shown, the wireless device 805 includes an on-chip system 822 that includes a digital baseband processor 824 and an analog baseband processor 826 that are coupled together. As illustrated in FIG. 8, a display controller 828 and a touchscreen controller 830 are coupled to the digital baseband processor 824. In turn, a touchscreen display 832 external to the on-chip system 822 is coupled to the display controller 828 and the touchscreen controller 830.

FIG. 8 further depicts a video encoder 834, e.g., a phase alternating line ("PAL") encoder, a sequential couleur a memoire ("SECAM") encoder, or a national television system(s) committee ("NTSC") encoder, may be coupled to the digital baseband processor 824. Further, a video amplifier 836 is coupled to the video encoder 834 and the touchscreen display 832. Also, a video port 838 is coupled to the video amplifier 836. As depicted in FIG. 8, a universal serial bus ("USB") controller 840 is coupled to the digital baseband processor 824. Also, a USB port 842 is coupled to the USB controller 840. A memory 844 and a subscriber identity module ("SIM") card 846 may also be coupled to the digital baseband processor 824. Further, as shown in FIG. 8, a digital camera 848 may be coupled to the digital baseband processor 824. In an exemplary aspect, the digital camera 848 is a charge-coupled device ("CCD") camera or a complementary metal-oxide semiconductor ("CMOS") camera.

As further illustrated in FIG. 8, a stereo audio CODEC 850 may be coupled to the analog baseband processor 826. Moreover, an audio amplifier 852 may coupled to the stereo audio CODEC 850. In an exemplary aspect, a first stereo speaker 854 and a second stereo speaker 856 are coupled to the audio amplifier 852. FIG. 8 shows that a microphone amplifier 858 may be also coupled to the stereo audio CODEC 850. Additionally, a microphone 860 may be coupled to the microphone amplifier 858. In a particular aspect, a frequency modulation ("FM") radio tuner 862 may be coupled to the stereo audio CODEC 850. Also, an FM antenna 864 is coupled to the FM radio tuner 862. Further, stereo headphones 866 may be coupled to the stereo audio CODEC 850.

FIG. 8 further indicates that a radio frequency ("RF") transceiver 868 may be coupled to the analog baseband processor 826. An RF switch 870 may be coupled to the RF transceiver 868 and an RF antenna 872. As shown in FIG. 8, a keypad 874 may be coupled to the analog baseband processor 826. Also, a mono headset with a microphone 876 may be coupled to the analog baseband processor 826. Further, a vibrator device 878 may be coupled to the analog baseband processor 826. FIG. 8 also shows that a power supply 880 may be coupled to the on-chip system 822. In a particular aspect, the power supply 880 is a direct current ("DC") power supply that provides power to the various components of the wireless device 805 that require power. Further, in a particular aspect, the power supply is a rechargeable DC battery or a DC power supply that is derived from an alternating current ("AC") to DC transformer that is connected to an AC power source.

In a particular aspect, the wireless device 805 may include a global positioning system ("GPS") module 884 coupled to the DSP 824 or the analog baseband processor 826. The GPS module 884 and at least one of the processors 824, 826 may provide a means for locating the wireless device 805.

As depicted in FIG. 8, the touchscreen display 832, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator 878, and the power supply 880 are external to the on-chip system 822.

The monetization and marketing of the reverse auction server could be accomplished in a number of manners. In one aspect, the reverse auction server 110 could be funded and operated by charging a commission to consumers and/or retailers for each transaction. In another aspect, the retailer or consumer could pay a daily, monthly, or annual subscription fee to have access to the reverse auction system 100. In yet another aspect, the consumer or retailer could pay a one-time fee to participate in the reverse auction system 100.

While the foregoing aspects describe the wireless device 805, one of skill in the art will appreciate that the wireless device 105 could be replaced by a personal computer, in one aspect. For example, the reverse auction purchasing process 400 could be initiated by a personal computer instead of the wireless device 805. For example, the consumer could be shopping at home over the Internet.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk, High Definition DVD ("HD-DVD") and Blu-ray disc where disks usually reproduce data magnetically, while discs reproduce data optically with lasers. Combinations of the above should also be included within the scope of computer-readable media.

Although selected embodiments have been illustrated and described in detail, it will be understood that various substitutions and alterations may be made therein without departing from the spirit and scope of the present invention, as defined by the following claims.

What is claimed is:

1. A computer, comprising:
   a transceiver operable to receive product information and transmit a discount;
   a processor, wherein the processor is configured with processor-executable instructions to perform operations comprising:
      the processor receiving product information;
      the processor receiving a first lowest price for the product and a store price for the product from a first retailer;
      the processor defining a seeding store price based upon the store price from the first retailer;
      the processor receiving a second lowest price for the product as offered from each of a plurality of second retailers;
      the processor determining participation among at least one the plurality of second retailers;

the processor determining consumer costs associated with purchasing the product from the first and the participating second retailers;

the processor defining a bid increment;

the processor determining a first offer in which (i) the first retailer presents the seeding store price as an offer and (ii) each of the participating second retailers subtract the associated consumer costs and the bid increment from the seeding store price to determine an offer for each of the participating second retailers;

the processor determining a subsequent offer, comprising:

(a) preventing the first or participating second retailers from participating further if the first offer is below or equal to the first or second lowest price as defined by each of the first and participating second retailers respectively;

(b) recalculating the offer for each of the remaining first or participating second retailers as remaining after (a) by subtracting the bid increment from the remaining first or participating second retailers' previously calculated offers; and (c) repeating steps (a) through (b) until a final offer is determined; and the processor transmitting a discount to purchase the product from each of the first or participating second retailers, wherein the discount is based on the most recently determined offer for each of the first and participating second retailers.

2. The computer of claim 1, wherein the processor determining participation among the at least one plurality of second retailers is based on physical proximity to the first retailer.

3. The computer of claim 1, wherein the processor determining participation among the at least one plurality of second retailers is based, for each of the second retailers, on the in-store inventory of the product respectively.

4. The computer of claim 1, wherein the processor determining participation among the at least one plurality of second retailers is determined based upon retailer preferences.

5. The computer of claim 4, wherein the retailer preferences specify that an individual second retailer will not participate if the first or at least one of the any other of the participating second retailers is owned by the individual second retailer.

6. The computer of claim 1, wherein the consumer costs are travel costs, consumer time cost, tax, purchase preferences, or any combination thereof.

7. The computer of claim 1, wherein the consumer costs are travel costs determined based on fuel costs, insurance costs, vehicle maintenance, public transportation costs, tolls, routes previously traveled, planned routes of travel, current destinations, previous destinations, or any combination thereof.

8. The computer of claim 1, wherein the final offer is determined when only one retailer remains in the subsequent bidding round.

9. A computer, comprising:

means for receiving product information;

means for receiving a first lowest price for the product and a store price for the product from a first retailer;

means for defining a seeding store price based upon the store price from the first retailer;

means for receiving a second lowest price for the product as offered from each of a plurality of second retailers;

means for determining participation among the plurality of second retailers;

means for determining consumer costs associated with purchasing the product from the first and the participating second retailers;

means for defining a bid increment;

means for determining a first offer in which (i) the first retailer presents the seeding store price as an offer and (ii) each of the participating second retailers subtract the associated consumer costs and the bid increment from the seeding store price to determine an offer for each of the participating second retailers;

means for determining a subsequent offer, comprising:

(a) means for preventing the first or participating second retailers from participating further if the first offer is below or equal to the first or second lowest price as defined by each of the first and participating second retailers respectively;

(b) means for recalculating the offer for each of the remaining first or participating second retailers remaining after (a) by subtracting the bid increment from the remaining first or participating second retailers' previously calculated offers; and (c) means for repeating steps (a) through (b) until a final offer is determined; and means for transmitting a discount to purchase the product from each of the first or participating second retailers, wherein the discount is based on the most recently determined offer for each of the first and participating second retailers.

10. The computer of claim 9, wherein the means for determining participation among the plurality of second retailers is based on physical proximity to the first retailer.

11. The computer of claim 9, wherein the means for determining participation among the plurality of second retailers is based, for each of the second retailers, on the in-store inventory of the product respectively.

12. The computer of claim 9, wherein the means for determining participation among the plurality of second retailers is determined based upon retailer preferences.

13. The computer of claim 12, wherein the retailer preferences specify that an individual second retailer will not participate if the first or any other of the participating second retailers is owned by the individual second retailer.

14. The computer of claim 9, wherein the consumer costs are travel costs, consumer time cost, tax, purchase preferences, or any combination thereof.

15. The computer of claim 9, wherein the consumer costs are travel costs determined based on fuel costs, insurance costs, vehicle maintenance, public transportation costs, tolls, routes previously traveled, planned routes of travel, current destinations, previous destinations, or any combination thereof.

16. The computer of claim 9, wherein the final offer is determined when only one retailer remains in the subsequent bidding round.

17. A non-transitory processor-readable medium having stored thereon processor executable instructions configured to cause a processor to perform operations comprising:

receiving product information;

receiving a first lowest price for the product and a store price for the product from a first retailer;

defining a seeding store price based upon the store price from the first retailer;

receiving a second lowest price for the product as offered from each of a plurality of second retailers;

determining participation among the plurality of second retailers;

determining consumer costs associated with purchasing the product from the first and the participating second retailers;

defining a bid increment;

determining a first offer in which (i) the first retailer presents the seeding store price as an offer and (ii) each of the participating second retailers subtract the associated consumer costs and the bid increment from the seeding store price to determine an offer for each of the participating second retailers;

determining a subsequent offer, comprising:
  (a) preventing the first or participating second retailers from participating further if the first offer is below or equal to the first or second lowest price as defined by each of the first and participating second retailers respectively;
  (b) recalculating the offer for each of the remaining first or participating second retailers remaining after (a) by subtracting the bid increment from the remaining first or participating second retailers' previously calculated offers; and
  (c) repeating steps (a) through (b) until a final offer is determined; and transmitting a discount to purchase the product from each of the first or participating second retailers, wherein the discount is based on the most recently determined offer for each of the first and participating second retailers.

18. The non-transitory processor-readable medium of claim 17, wherein determining participation among the plurality of second retailers is based on physical proximity to the first retailer.

19. The non-transitory processor-readable medium of claim 17, wherein determining participation among the plurality of second retailers is based, for each of the second retailers, on the in-store inventory of the product respectively.

20. The non-transitory processor-readable medium of claim 17, wherein determining participation among the plurality of second retailers is determined based upon retailer preferences.

21. The non-transitory processor-readable medium of claim 20, wherein the retailer preferences specify that an individual second retailer will not participate if the first or any other of the participating second retailers is owned by the individual second retailer.

22. The non-transitory processor-readable medium of claim 17, wherein the consumer costs are travel costs, consumer time cost, tax, purchase preferences, or any combination thereof.

23. The non-transitory processor-readable medium of claim 17, wherein the consumer costs are travel costs determined based on fuel costs, insurance costs, vehicle maintenance, public transportation costs, tolls, routes previously traveled, planned routes of travel, current destinations, previous destinations, or any combination thereof.

24. The non-transitory processor-readable medium of claim 17, wherein the final offer is determined when only one retailer remains in the subsequent bidding round.

25. A computer-implemented method for providing a discount for a product, the method comprising:

receiving a first lowest price for the product and a store price for the product from a first retailer with a processor;

defining a seeding store price based upon the store price from the first retailer with a processor;

receiving a second lowest price for the product as offered from each of a plurality of second retailers with a processor;

determining participation among the plurality of second retailers with a processor;

determining consumer costs associated with purchasing the product from the first and the participating second retailers with a processor;

defining a bid increment with a processor;

determining a first offer with a processor in which (i) the first retailer presents the seeding store price as an offer and (ii) each of the participating second retailers subtract the associated consumer costs and the bid increment from the seeding store price to determine an offer for each of the participating second retailers;

determining a subsequent offer with a processor, comprising:
  (a) preventing the first or participating second retailers from participating further if the first offer is below or equal to the first or second lowest price as defined by each of the first and participating second retailers respectively;
  (b) recalculating the offer for each of the remaining first or participating second retailers remaining after (a) by subtracting the bid increment from the remaining first or participating second retailers' previously calculated offers; and
  (c) repeating steps (a) through (b) until a final offer is determined; and transmitting a discount to purchase the product from each of the first or participating second retailers with a processor, wherein the discount is based on the most recently determined offer for each of the first and participating second retailers.

26. The computer-implemented method of claim 25, wherein determining participation among the plurality of second retailers is based on physical proximity to the first retailer.

27. The computer-implemented method of claim 25, wherein determining participation among the plurality of second retailers is based, for each of the second retailers, on the in-store inventory of the product respectively.

28. The computer-implemented method of claim 25, wherein determining participation among the plurality of second retailers is determined based upon retailer preferences.

29. The computer-implemented method of claim 28, wherein the retailer preferences specify that an individual second retailer will not participate if the first or any other of the participating second retailers is owned by the individual second retailer.

30. The computer-implemented method of claim 25, wherein the consumer costs are travel costs, consumer time cost, tax, purchase preferences, or any combination thereof.

31. The computer-implemented method of claim 25, wherein the consumer costs are travel costs determined based on fuel costs, insurance costs, vehicle maintenance, public transportation costs, tolls, routes previously traveled, planned routes of travel, current destinations, previous destinations, or any combination thereof.

32. The computer-implemented method of claim 25, wherein the final offer is determined when only one retailer remains in the subsequent bidding round.

* * * * *